(12) United States Patent
Ishikawa et al.

(10) Patent No.: US 11,767,071 B2
(45) Date of Patent: Sep. 26, 2023

(54) WORK VEHICLE

(71) Applicant: Kubota Corporation, Osaka (JP)

(72) Inventors: Junichi Ishikawa, Sakai (JP); Minoru Hiraoka, Sakai (JP)

(73) Assignee: Kubota Corporation, Osaka (JP)

( * ) Notice: Subject to any disclaimer, the term of this patent is extended or adjusted under 35 U.S.C. 154(b) by 721 days.

(21) Appl. No.: 16/762,277

(22) PCT Filed: Dec. 25, 2018

(86) PCT No.: PCT/JP2018/047425
§ 371 (c)(1),
(2) Date: May 7, 2020

(87) PCT Pub. No.: WO2019/131573
PCT Pub. Date: Jul. 4, 2019

(65) Prior Publication Data
US 2020/0354003 A1    Nov. 12, 2020

(30) Foreign Application Priority Data

Dec. 25, 2017   (JP) ................................. 2017-248205
Dec. 25, 2017   (JP) ................................. 2017-248206
(Continued)

(51) Int. Cl.
*B60K 7/00* (2006.01)
*B62D 12/02* (2006.01)
(Continued)

(52) U.S. Cl.
CPC ............ *B62D 53/00* (2013.01); *B60K 7/0007* (2013.01); *B60K 7/0015* (2013.01); *B62D 12/02* (2013.01); *B62D 61/10* (2013.01)

(58) Field of Classification Search
CPC ................................ B62D 53/00; B62D 61/10
See application file for complete search history.

(56) References Cited

U.S. PATENT DOCUMENTS 3,481,418 A * 12/1969 Wallan .................... B62D 61/12
                                                     180/23
3,529,690 A *  9/1970 Mathew ................. B62D 53/02
                                                     180/235

(Continued)

FOREIGN PATENT DOCUMENTS

CN    106864623 A  *  6/2017
CN    107985442 A  *  5/2018 ........... B60K 7/0007
(Continued)

*Primary Examiner* — Jacob D Knutson
(74) *Attorney, Agent, or Firm* — THE WEBB LAW FIRM

(57) ABSTRACT

A work vehicle includes a vehicle body, a plurality of traveling devices disposed on the right and left sides on the front and rear sides of the vehicle body respectively, a plurality of bending link mechanisms configured to liftably support each one of the traveling devices to the vehicle body and a plurality of drive operating devices capable of changing the posture of each one of the plurality of bending link mechanisms. The vehicle body is split into a front side body section and a rear side body section. The front side body section and the rear side body section are configured to be bendably pivotable relative to each other via a pivot interlocking mechanism.

12 Claims, 27 Drawing Sheets

(30) Foreign Application Priority Data

Dec. 25, 2017 (JP) .................................. 2017-248208
Dec. 12, 2018 (JP) .................................. 2018-232470

(51) Int. Cl.
  *B62D 61/10* (2006.01)
  *B62D 53/00* (2006.01)

(56) References Cited

U.S. PATENT DOCUMENTS

| | | | |
|---|---|---|---|
| 3,642,085 A * | 2/1972 | Bird | B60G 21/06 |
| | | | 180/41 |
| 4,558,758 A | 12/1985 | Littman et al. | |
| 4,932,491 A * | 6/1990 | Collins, Jr. | B62D 49/08 |
| | | | 280/5.2 |
| 4,966,242 A * | 10/1990 | Baillargeon | B62D 55/0655 |
| | | | 280/421 |
| 7,475,745 B1 * | 1/2009 | DeRoos | B62D 55/02 |
| | | | 180/8.1 |

FOREIGN PATENT DOCUMENTS

| | | | |
|---|---|---|---|
| JP | S58157783 U | | 10/1983 |
| JP | S61500604 A | | 4/1986 |
| JP | H781639 A | | 3/1995 |
| JP | H9142347 A | | 6/1997 |
| JP | H1059202 A | | 3/1998 |
| JP | 2005131756 A | | 5/2005 |
| JP | 2006264510 A | * | 10/2006 |
| JP | 2006264510 A | | 10/2006 |
| JP | 2007290054 A | * | 11/2007 |
| JP | 2007290054 A | | 11/2007 |
| JP | 200996335 A | | 5/2009 |

* cited by examiner

WORK VEHICLE

This application is the United States national phase of International Application No. PCT/JP2018/047425 filed Dec. 25, 2018, and claims priority to Japanese Patent Application Nos. 2017-248205, 2017-248206, and 2017-248208, filed Dec. 25, 2017, and Japanese Patent Application No. 2018-232470 filed Dec. 12, 2018, the disclosures of which are hereby incorporated by reference in their entirety.

TECHNICAL FIELD

The present invention relates to a work vehicle suitable for traveling on a highly rugged road surface.

BACKGROUND ART

Conventionally, there is known an arrangement in which a vehicle body includes an articulated manipulator (robot arm) acting as a utility implement and a plurality of traveling devices, each traveling device is supported to the vehicle body via a bending link mechanism having two joints and having a plurality of links pivotally coupled to each other to be pivotable about a horizontal axis (see Patent Literature 1 for instance).

PRIOR ART DOCUMENT(S)

Patent Literature(s)

Patent Literature 1: Japanese Unexamined Patent Application Publication No. "Heisei" 9-142347 (JP H09-142347A)

SUMMARY OF THE INVENTION

Objects to be Solved by the Invention

[Object 1]
In the conventional arrangement described above, it is possible to travel over even a highly rugged ground surface by changing the heights of the plurality of traveling devices individually through bending/stretching of the bending link mechanisms. However, since the plurality of links are configured to be pivotable about their respective horizontal axes, the traveling devices can change their heights, but their orientations remain fixed.

As a result, in the case of straight traveling, this can be coped with by rotating the plurality of traveling devices about the horizontal axes. However, in the case of turn traveling with turning the vehicle body to either the right or left direction, it is necessary to change the orientation of the vehicle body to turn the vehicle body by providing a speed difference between right and left traveling devices or by using the articulated manipulator (robot arm) provided on the vehicle body. With such arrangement configured to provide a turn traveling by the above-described manner, traveling will be made with skidding of the traveling devices, so that an excessive force may be applied to the traveling devices along the lateral direction, which may result in deterioration of durability.

Thus, there has been a need for allowing traveling to ride over even on a highly rugged road surface, yet allowing also a turn traveling without application of an excessive force to the traveling devices.

[Object 2]
Further, the above-described conventional arrangement provides additional functions to its traveling function, such as a function allowing traveling to ride over even on a highly rugged traveling road surface while changing heights of the traveling devices relative to the vehicle body through the link mechanisms, and also function allowing self-returning of the vehicle by means of a manipulator in the case of lateral falling or tilting of the vehicle. Then, it is conceivable to apply the above-described arrangement to an agricultural work vehicle which carries out a utility work while traveling in e.g. a rugged field. However, when the application of the above-described arrangement to an agricultural work vehicle is contemplated, the application is difficult due to a disadvantage as follows.

Namely, an agricultural work vehicle assumed to employ a similar arrangement to the above-described arrangement, the vehicle may be used for carrying out a utility work by its implement mounted on the vehicle body, while traveling over a ridge where agricultural produces are plated in a row or over a narrow bank. In such case, if the above-described conventional arrangement is applied, since the bending link mechanisms are disposed on the vehicle body inner side in the right/left direction and the drive wheels are disposed on the vehicle body outer side in the right/left direction of the bending link mechanisms, the bending link mechanisms can come into accidental contact with the side portion of the ridge, thus destroying the ridge or conversely the bending link mechanisms can be damaged also.

Further, in case the agricultural work vehicle is to carry out a different operation of e.g. lifting and transporting an object such as an agricultural produce, it is necessary for the vehicle to include, in addition to the traveling devices, an implement for object transport such as a manipulator, etc. Thus, there will occur disadvantage of complication of its arrangement.

Thus, there has been a need for a work vehicle that can maintain its vehicle body under a posture suitable for a work even when unevenness is present on the traveling road surface and that also can carry out work traveling under a state suitable for an agricultural work.

[Object 3]
The wheel support arrangement according to the above-described conventional arrangement is intended to allow traveling with maintaining the vehicle body under an appropriate posture even in the presence of unevenness on the traveling road surface through bending/stretching of the link mechanism. Then, it is conceivable to apply such wheel support arrangement to an agricultural work vehicle that travels in a work site having unevenness on the traveling road surface.

However, with the above-described conventional arrangement, each one of the plurality of joints includes an electric motor for driving, a reduction gear mechanism, etc., so the driving arrangement tends to be complicated, thus being disadvantageous as inviting cost increase.

Thus, there has been a need for a work vehicle that allows simplification of its driving arrangement, yet allowing to maintain its vehicle body under an appropriate posture even in a highly rugged work site.

Solution to the Object

[1] Solution corresponding to [Object 1] is proposed as follows.
A work vehicle comprising:
a vehicle body;

a plurality of traveling devices disposed on the right and left sides on the front and rear sides of the vehicle body respectively;

a plurality of bending link mechanisms configured to liftably support each one of the traveling devices to the vehicle body; and a plurality of drive operating devices capable of changing the posture of each one of the plurality of bending link mechanisms;

wherein the vehicle body is split into a front side body section having the right and left traveling devices disposed on the front side and a rear side body section having the right and left traveling devices disposed on the rear side; and wherein the front side body section and the rear side body section are configured to be bendably pivotable relative to each other via a pivot interlocking mechanism.

With the present invention, by expanding and contracting the bending link mechanisms to change the heights of the plurality of traveling devices relative to the vehicle body, it is possible to travel to ride over an even highly rugged road surface.

And, when the work vehicle is to make a turn traveling to either the right or left side, while causing the vehicle body to travel by the plurality of traveling devices, the front side body section and the rear side body section will be pivoted to be bent via the pivot interlocking mechanism. In this, as the vehicle body is set to a body-bent state, the right and left traveling devices on the front side together with the front side body section will have their orientations changed relative to the rear side body section, whereas the right and left traveling devices on the rear side together with the rear side body section will have their orientations changed relative to the front side body section. As a result, the turn traveling can proceed in a smooth manner without application of any excessive forces to the traveling devices.

Thus, the turn traveling can proceed without application of any excessive forces to the traveling devices, while it is possible to travel to ride over an even highly rugged road surface.

In the present invention, preferably, there is provided an actuator capable of changing a bending pivot angle between the front side body section and the rear side body section.

With the above-described arrangement, in response to an operation of the actuator, the front side body section and the rear side body section are pivoted and bent relative to each other, thus allowing a turn of the work vehicle. Also, through adjustment of an operational state of the actuator, it is possible to effect a turn traveling with changing of the bending pivot angle to a desired pivot angle. In this way, with use of the actuator, a turn traveling is made possible in a speedy and reliable manner and at a desired pivot angle.

In the present invention, preferably, a bending pivot angle between the front side body section and the rear side body section can be changed based on a speed difference between the right and left traveling devices in at least one of the front side body section and the rear side body section.

With the above-described arrangement, the work vehicle can make a turn by providing a speed difference between the right and left traveling devices in one of the front side body section and the rear side body section whichever section is located on the leading side in the advancing direction. For example, in case the work vehicle is traveling forwardly, by providing a speed difference between the driving speeds of the right and left traveling devices mounted in the front side body section, the vehicle will effect a turn traveling with the front side body section being bent relative to the rear side body section.

As a result, since the turning is made by a speed difference between right and left traveling devices, no special device such as a turning actuator is needed, and while turn traveling is possible without application of an excessive force to the traveling devices, simplification of the arrangement can yet be made.

[2] Solution corresponding to [Object 2] is proposed as follows.

A work vehicle comprising:

a vehicle body;

traveling drive wheels provided on the right and left sides on opposed front and rear sides of the vehicle body;

a plurality of vehicle body supporting portions configured to support each one of the drive wheels to the vehicle body with allowing change of its height position; and a drive operating device capable of variably operating the vehicle body supporting portions;

wherein the plurality of drive wheels are supported to be disposed on the vehicle body inner side in the right/left direction relative to the vehicle body supporting portions.

With the present invention, the relative heights of the traveling drive wheels provided on the right and left sides on the front and rear sides of the vehicle body can be changed by the drive operating device. As a result, even in the case of traveling on a rugged ground surface, traveling is possible with keeping the vehicle body under an appropriate posture with stable support on the ground surface via the plurality of drive wheels. And, as the plurality of drive wheels are supported to be disposed on the vehicle body inner side in the right/left direction relative to the vehicle body supporting portions, in case e.g. traveling is made with the right and left drive wheels being positioned on the right and left sides across a ridge of a bank therebetween, the possibility of the hydraulic motor coming into accidental contact with the side face of the ridge or bank to be damaged thereby can be avoided, so that the traveling can be made in a favorable manner.

Further, in the case of an arrangement that the vehicle body supporting portions make a turn with mutual approaching of the right and left drive wheels, it becomes possible to clamp an object with a simple arrangement with using the drive wheels on the right and left sides. In this case, as the drive wheels effectively act on the object, there can be obtained an advantage of clamping of an object being made easier.

Therefore, it has become possible to maintain the vehicle body under a posture suitable for a work even when unevenness is present on the traveling road surface and also to effect work traveling under a state suitable for an agricultural work.

In the present invention, preferably:

there are provided a plurality of turning mechanisms configured to support the plurality of vehicle body supporting portions respectively to the vehicle body with allowing changing of the respective orientations thereof about a vertical axis.

With the above-described arrangement, if orientation is changed about the vertical axis so that the vehicle body supporting portions on the right and left sides approach each other with using the turning mechanisms, it becomes possible to clamp an object by the right and left drive wheels. Namely, it becomes possible to cause the right and left drive wheels to function as a device for clamping and transporting an object as a load. As a result, clamping of an object is made possible through such simple arrangement, without using any object transporting implement such as a manipulator, etc.

In the present invention, preferably:
on the right and left opposed sides, an auxiliary wheel is provided to be positioned between the drive wheel on the front side and the drive wheel on the rear side; and
when the vehicle body has its posture maintained with either one of a combination of the drive wheel and the auxiliary wheel on the front side, and a combination of the drive wheel and the auxiliary wheel on the rear side, the right and left drive wheels disposed on the other are set afloat the ground surface and pivoted to approach each other to allow clamping of an object therebetween.

With the above-described arrangement, while the posture of the front side of the vehicle body is maintained by the combination of the drive wheel and the auxiliary wheel on the front side on the right and left opposed sides, the right and left drive wheels on the rear side will be set afloat the ground surface and pivoted to approach each other to allow clamping of an object therebetween. Conversely, while the posture of the rear side of the vehicle body is maintained by the combination of the drive wheel and the auxiliary wheel on the rear side on the right and left opposed sides, the right and left drive wheels on the front side will be set afloat the ground surface and pivoted to approach each other to allow clamping of an object therebetween.

Namely, one of the combination of the drive wheel and the auxiliary wheel on the front side and the combination of the drive wheel and the auxiliary wheel on the rear side functions as a "leg" for supporting the vehicle body, and the other thereof functions as a means/device for clamping and transporting an object. In this way, transport of an object can be coped with by such simple arrangement with using only the four traveling operational sections.

In the present invention, preferably:
each vehicle body supporting portion comprises a bending link mechanism having a first link having one end portion thereof supported to the vehicle body to be pivotable about a horizontal axis and a second link having one end portion thereof supported to the other end portion of the first link to be pivotable about a horizontal axis; and
the drive wheel is supported to the other end portion of the second link and the auxiliary wheel is supported to a coupling portion between the first link and the second link.

With the above-described arrangement, each one of the plurality of vehicle body supporting portions can support the vehicle body in contact with the ground surface by the drive wheel and the auxiliary wheel in a stable manner, with a ground contact width wide in the front/rear direction. And, by changing the pivotal posture of the first link relative to the vehicle body and changing the pivotal posture of the second link relative to the first link, the drive wheel and the auxiliary wheel can be lifted up/down relative to the vehicle body. As a result, when the vehicle body is to be supported, support is possible under a stable posture with the wide ground contact width provided by the pair of right and left drive wheel and auxiliary wheel. Moreover, it is possible to use the pivot shaft for pivotally coupling the first link to the second link as a pivot shaft for the auxiliary wheel also. Thus, as compared with an arrangement in which a support shaft dedicated to supporting of the auxiliary wheel is provided, the support arrangement can be simplified.

In the present invention, preferably:
the turning mechanism is capable of changing the respective wheel body supporting portions disposed in opposition to each other in the vehicle body right/left direction to different orientations about the vertical axis; and
the drive wheel is supported to the vehicle body supporting portion to be changeable in its orientation about the vertical axis.

With the above-described arrangement, when the vehicle body supporting portions disposed in opposition to each other in the vehicle body right/left direction are changed to mutually different directions (orientations) (right direction or left direction) by an operation of the turning mechanism, as the positions of the drive wheels relative to the vehicle body are different from each other in the right/left direction, it becomes possible to change the right/left spacing between the right and left drive wheels. And, since the drive wheels can be changed in their orientations about the vertical axis relative to the vehicle body supporting portions, the orientations of the drive wheels can be set as desired in both the case of the right/left spacing between the right and left drive wheels being increased and the case of the spacing being decreased.

Consequently, it is possible to change the right/left width of the wheels through effective utilization of the arrangement of the vehicle body supporting portion, thus it becomes conveniently possible to cope with different working widths, so that the work traveling under a state suitable for an agricultural work is made possible.

According to a characterizing feature of a work vehicle relating to the present invention:
A work vehicle comprising:
a vehicle body;
traveling drive wheels provided on the right and left sides on opposed front and rear sides of the vehicle body;
a plurality of vehicle body supporting portions configured to support each one of the drive wheels to the vehicle body with allowing change of its height position;
a drive operating device capable of variably operating the vehicle body supporting portions; and
a plurality of turning mechanisms configured to support the plurality of vehicle body supporting portions respectively to the vehicle body with allowing changing of the respective orientations thereof about a vertical axis;
wherein the turning mechanism is capable of changing the respective wheel body supporting portions disposed in opposition to each other in the vehicle body right/left direction to different orientations about the vertical axis; and
wherein the drive wheel is supported to the vehicle body supporting portion to be changeable in its orientation about the vertical axis.

With the above-described arrangement, the relative heights of the traveling drive wheels provided on the right and left sides on the front and rear sides of the vehicle body can be changed by the drive operating device. As a result, even in the case of traveling on a rugged ground surface, traveling is possible with keeping the vehicle body under an appropriate posture with stable support on the ground surface via the plurality of drive wheels.

And, when the vehicle body supporting portions disposed in opposition to each other in the vehicle body right/left direction are changed to mutually different directions (right direction or left direction) by an operation of the turning mechanism, as the positions of the drive wheels relative to the vehicle body are different from each other in the right/left direction, it becomes possible to change the right/left spacing between the right and left drive wheels. And, since the drive wheels can be changed in their orientations about the vertical axis relative to the vehicle body supporting portions, the orientations of the drive wheels can be set to a desired orientation in both the case of the right/left spacing between the right and left drive wheels being increased and the case of the spacing being decreased. Consequently, it is possible to change the right/left width of the wheels through effective utilization of the arrangement of the vehicle body supporting portion, thus it becomes conveniently possible to cope with different working widths, so that the work traveling under a state suitable for an agricultural work is made possible.

In the present invention, preferably:
by changing the vehicle body supporting portions disposed in opposition to each other in the vehicle body right/left direction to mutually different directions by the turning mechanism, the spacing between the drive wheels of the two vehicle body supporting portions can be changed; and
by changing the orientations of the two drive wheels about the vertical axis, rotational directions of the two drive wheels can be set parallel to each other.

With the above-described arrangement, when the orientations of the right and left vehicle body supporting portions are changed to the right/left outer side about the vertical axis relative to the vehicle body, the spacing between the right and left drive wheels is increased. Conversely, when the orientations of the right and left vehicle body supporting portions are changed to the right/left inner side about the vertical axis relative to the vehicle body, the spacing between the right and left drive wheels is decreased. In both these states, the orientations of the drive wheels on the right and left opposed sides can be changed relative to the vehicle body supporting portions. Thus, it is possible to set the rotational directions of the right and left drive wheels parallel to each other, in other words, to straight traveling posture oriented in the front/rear direction. As a result, straight traveling can be effected with varying the spacing (tread width) between the right and left drive wheels.

Therefore, the right/left spacing between wheels can be changed through effective utilization of the vehicle body supporting portions, so that work traveling under straight traveling state with a variety of working widths is made possible, thus providing greater convenience.

[3] Solution corresponding to [Object 3] is proposed as follows.

A work vehicle comprising:
a vehicle body;
a plurality of traveling device for driving traveling;
a plurality of articulated link mechanisms each comprising a plurality of links pivotally connected to each other to provide at least two or more joints and configured to support each one of the traveling devices to the vehicle body with allowing lifting up/down thereof; and
a drive operating device capable of changing postures of the articulated link mechanisms;
wherein a first link included in the plurality of links and located closest to the vehicle body is supported to be pivotable about a horizontal axis with its body side coupling portion acting as a pivot;
wherein there is provided a manual operation type position fixing device capable of selectively fixing the first link at any one of a plurality of preset pivot switching positions; and
wherein the drive operating device changes the posture of another link included in the plurality of links than the first link.

With the present invention, to the vehicle body, a plurality of traveling devices are supported via the articulated link mechanisms to be liftable up/down respectively. As the articulated link mechanism has its posture changed by the drive operating device, the height (relative height) of each one of the plurality of traveling devices relative to the vehicle body can be changed. Namely, since the heights of the traveling devices provided on the right and left opposed sides on the front and rear sides of the vehicle body can be changed, even in the case of traveling on an uneven ground surface, traveling can be made with maintaining the vehicle body under an appropriate posture with stable ground contacting support provided by the plurality of traveling devices.

The first link of the plurality of links can be switched to one of a plurality of pivot switching positions when being pivoted about a horizontal axis with its body side coupling portion acting as a pivot. And, after being switched to any position, it can be fixed by the manual operation type position fixing device. Another or the other link other than the first link can have it posture changed by the drive operating device.

For instance, in accordance with a difference of type of utility work, the position of the first link may be set to a position suitable for the work in advance. Then, the posture of the other link may be changed by the drive operating device, whereby traveling is possible with maintaining the vehicle body under an appropriate posture. As a result, the drive operating device does not use any device for changing the posture of the first link, so that simplification of driving arrangement is made possible, yet, work traveling is possible with maintaining the vehicle body under a posture suitable for the work.

Therefore, while simplification of driving arrangement is made possible, work traveling is possible with keeping the vehicle body under an appropriate posture even in a highly rugged work site.

In the present invention, preferably:
the articulated link mechanism includes, as the other link, a second link having one end portion thereof supported to the other end portion of the first link to be pivotable about a horizontal axis and having the other end portion thereof used for supporting the traveling device.

With the above-described arrangement, the first link and the second link together constitute the articulated link mechanism. And, when the second link is pivotally operated after switching the first link to a pivot position suitable for the work, the traveling device can be supported to the vehicle body to be liftable up/down. As the drive operating device is configured simply to change the posture of one link of the two links, the driving arrangement is made simple.

In the present invention, preferably, the drive operating device comprises a hydraulic cylinder.

With the above-described arrangement, the posture changing operation of the articulated link mechanism is carried out by the hydraulic cylinder. Since the hydraulic cylinder is more resistant against possible intrusion of fine dust, water, or the like than combination of an electric motor and a gear mechanism, thus being less vulnerable to occurrence of malfunction or the like from adverse influence therefrom.

In the present invention, preferably:
the articulated link mechanism is supported to the vehicle body to be changeable in its orientation about a vertical axis; and
a hydraulic cylinder for turning operation is provided for changing the orientation of the articulated link mechanism.

With the above-described arrangement, by changing the orientation of the articulated link mechanism about the vertical axis, the right/left orientation of the traveling device relative to the vehicle body can be changed. When turning is to be made to either right or left side, the orientations of the traveling devices can be changed to the turning direction, whereby traveling drive is possible under a condition of no excessive lateral force being applied to the traveling devices.

Further and other characterizing features and advantageous effects achieved thereby will become apparent upon reading the following description with reference to the accompanying drawings.

EMBODIMENTS OF THE INVENTION

First Embodiment

Figure 1:
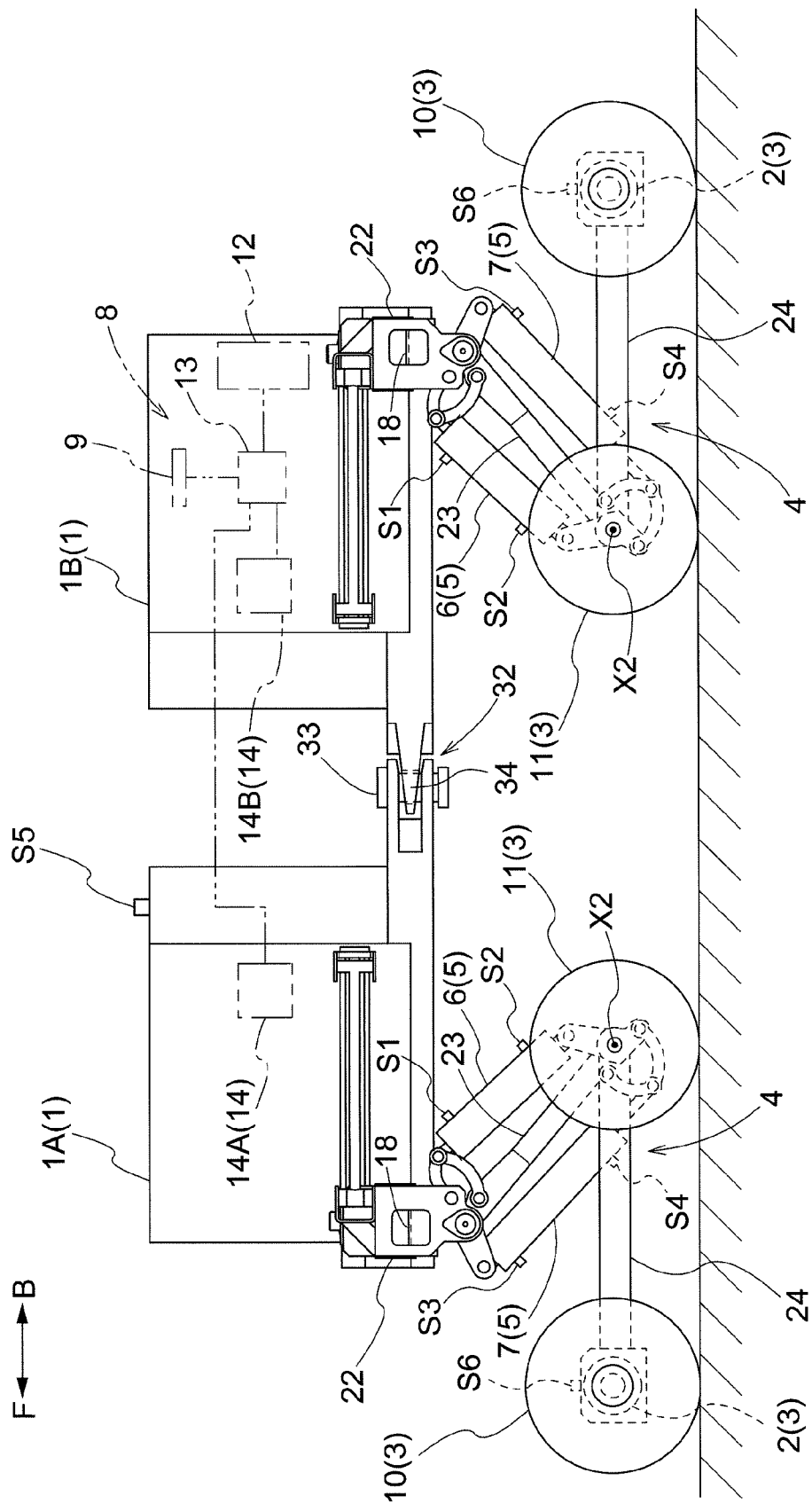
FIG. 1 is an overall side view showing a work vehicle according to a first embodiment (applied also to the drawings up to FIG. 10)
Figure 2:
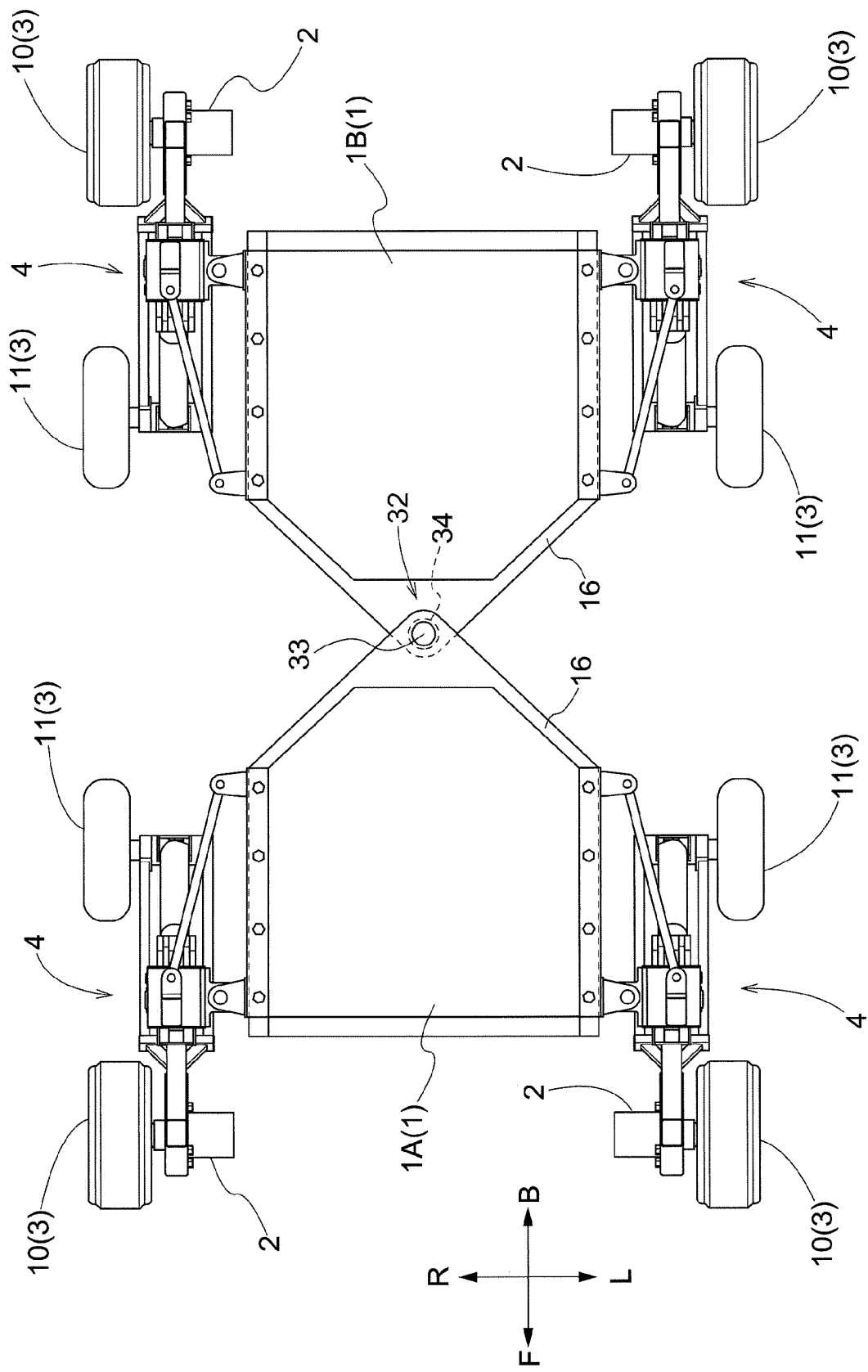
FIG. 2 is a plan view of the work vehicle.

[General Arrangement]
As shown in FIGS. 1 and 2, a work vehicle includes a vehicle body 1 in the form of an approximately rectangular frame for supporting the entire vehicle, a plurality of (specifically four) traveling devices 3 driven by hydraulic motors 2, a plurality of bending link mechanisms 4 configured to support the plurality of traveling devices 3 to the vehicle body respectively with allowing position changes thereof, a plurality of hydraulic cylinders 6, 7 as a plurality of "drive operating device 5" capable of variably operating the bending link mechanisms 4, a work oil feeding device 8 for feeding work oil to the plurality of hydraulic motors 2 and the plurality of hydraulic cylinders 6, 7, and a control device 9 for controlling operations of the work oil feeding device 8. Though not shown, by placing and supporting various kinds of implements such as a harvester device, a chemical agent spraying device, etc. to the vehicle body 1, various kinds of utility works can be carried out while moving/traveling.

In this embodiment, when definition are to be made for the front and rear sides of the vehicle body, one side preset of the sides along the vehicle body advancing direction is defined as the "front side", and the other is defined as the "rear side". And, when the right and left sides of the vehicle body are to be defined, these right and left sides will be defined as seen in the direction of the vehicle body advancing direction. Namely, the direction denoted with a sign (F) in FIG. 1 is the vehicle body front side and the direction denoted with a sign (B) is the vehicle body rear side, the direction denoted with a sign (R) in FIG. 2 is the vehicle body right side and the direction denoted with a sign (L) is the vehicle body left side, respectively.

On the front and rear opposed sides of the vehicle body 1, there are provided total four sets of right and left paired bending link mechanisms 4 and traveling devices 2. The traveling device 3 includes a drive wheel 10 incorporating the hydraulic motor 2 at its bearing portion and an auxiliary wheel 11 supported to be freely rotatable. The plurality of drive wheels 10 can be rotatably driven respectively by operating the hydraulic motors 2. The plurality of hydraulic cylinders 6, 7 are capable of changing the postures of the plurality of bending link mechanisms 4 respectively.

The work oil feeding device 8 includes a hydraulic pump 13 driven by an engine 12 mounted on the vehicle to feed work oil, a hydraulic control unit 14 for adjusting feeding condition of the work oil from the hydraulic pump 13, a work oil tank (not shown) for reserving an amount of work oil therein, and so on. The control device 9 controls the hydraulic control unit 14 based on instruction information inputted via an unillustrated manual input device such as a remote controller, etc. or preset and prestored instruction information, etc. in such a manner that oil feeding states to the respective hydraulic cylinders 6, 7 and the respective hydraulic motors 2 may become desired feeding states. The hydraulic control unit 14 includes a plurality of hydraulic valves (not shown) in correspondence with the respective hydraulic cylinders 6, 7 and the respective hydraulic motors 2, respectively.

[Wheel Supporting Arrangement]

Next, a supporting arrangement for supporting the traveling devices 3 to the vehicle body 1 will be described.

The plurality of traveling devices 3 are supported to the vehicle body 1 via the bending link mechanisms 4 to be liftable up/down respectively. The bending link mechanism 4 is supported to a support frame 16 on the vehicle body 1 side via a vehicle body side supporting portion 15.

Figure 3:
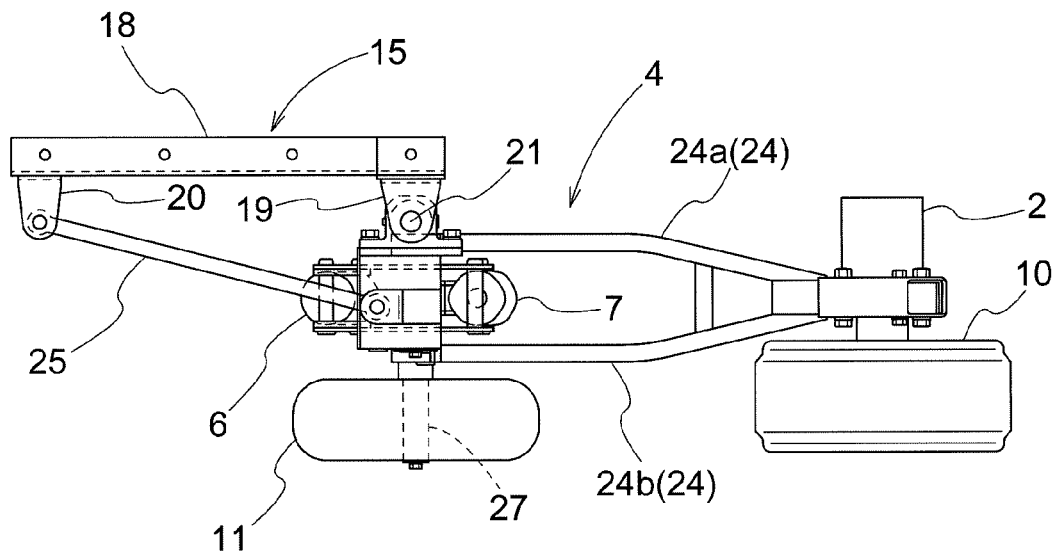
FIG. 3 is a plan view of a bending link mechanism.
Figure 4:
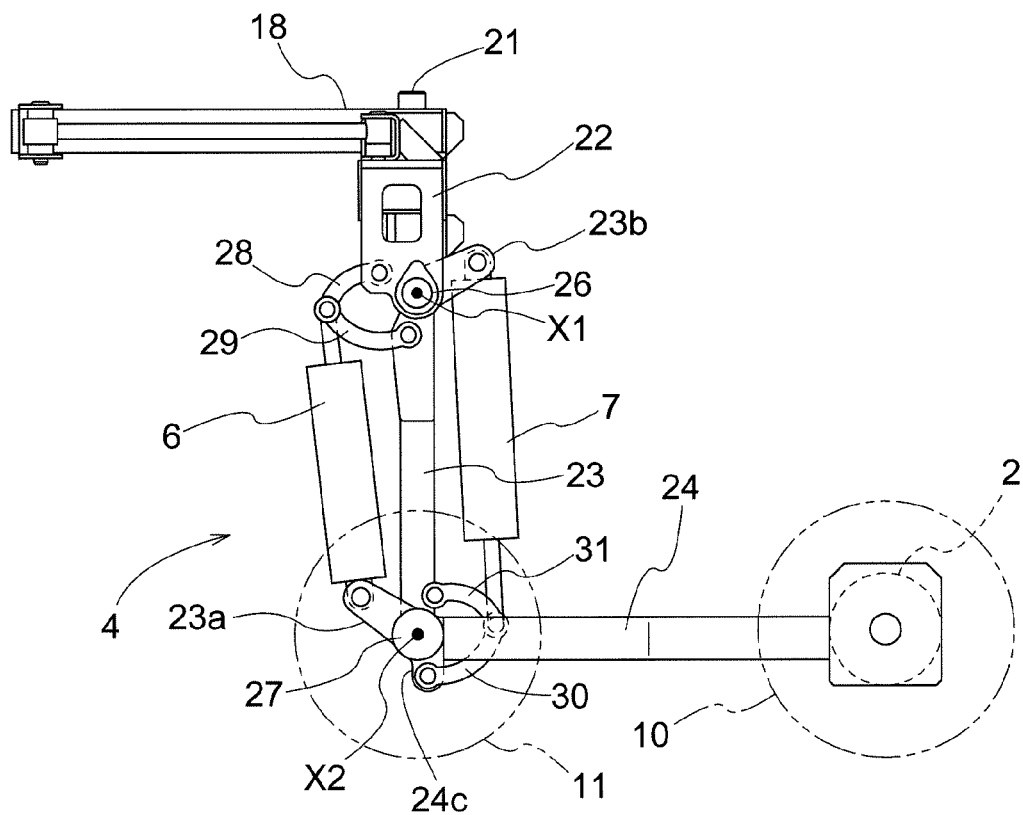
FIG. 4 is a side view of the bending link mechanism.
Figure 5:
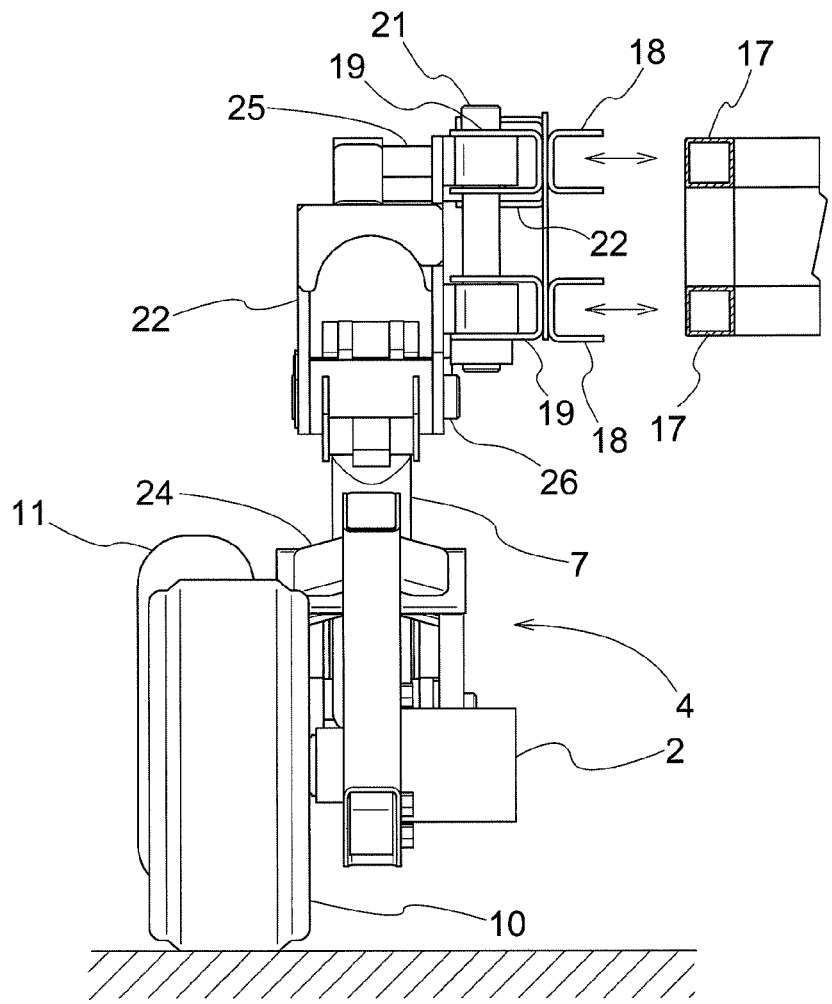
FIG. 5 is a front view showing an attachment state of the bending link mechanism under a removed state.
Figure 6:
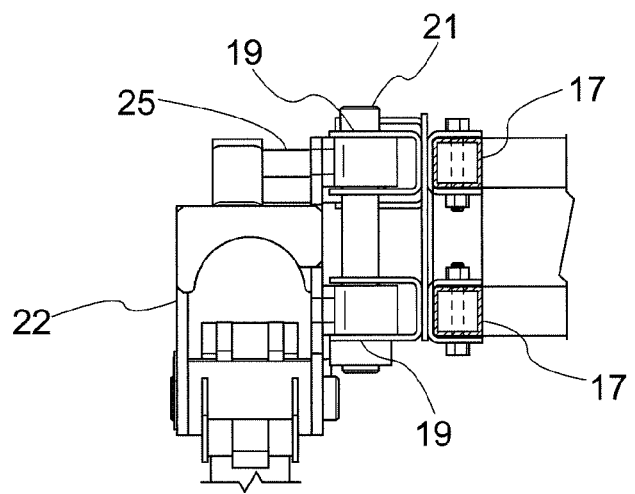
FIG. 6 is a front view showing an attachment state of the bending link mechanism under an attached state.

As shown in FIGS. 3, 4 and 5, the vehicle body side supporting portion 15 includes a coupling member 18 which engages by sandwiching a pair of upper and lower front/rear oriented frame bodies 17 in the form of angular cylinders provided at lateral portions of the support frame 16 and which also is to be removably bolt-connected thereto; a one end side pivot bracket 19 disposed at an outer side portion in the vehicle body front/rear direction of the coupling member 18; an other end side pivot bracket 20 disposed at an inner side portion in the vehicle body front/rear direction of the coupling member 16; and a vertically oriented coupling support shaft 21 supported to the one end side pivot bracket 19.

The bending link mechanism 4 includes a base end portion 22 which is supported to the vehicle body side supporting portion 15, a first link 23 having one end portion thereof supported to a lower portion of the base end portion 22 to be pivotable about a horizontal axis X1, and a second link 24 having one end portion thereof supported to the other end portion of the first link 23 to be pivotable about a horizontal axis X2 and having the other end portion thereof to which the drive wheel 10 is supported.

More particularly, the base end portion 22 is provided in the form of a rectangular frame as seen in a plan view and is supported to the outer side pivot bracket 19 of the vehicle body side supporting portion 15 at a portion displaced to the inner side in the vehicle body lateral width direction. A coupling link 25 is coupled to and between the other end side pivot bracket 20 of the vehicle body side supporting portion 15 and the base end portion 22. In this way, the base end portion 22 is supported in a stable manner to the vehicle body side supporting portion 15 with a large spacing in the front/rear direction.

Between and across right and left opposed sides of the base end portion 22, a support shaft 26 provided at one end of the first link 23 is pivotally supported, and the first link 23 is coupled to the lower portion of the base end portion 22 to be pivotable about the axis of the support shaft 26.

As shown in FIG. 4, the first link 23 includes a base end side arm portion 23b and an other end side arm portion 23a. At one end side portion of the first link 23, there is integrally formed the base end side arm portion 23b which extends obliquely outwardly upwards. At the other end side portion of the first link 23, there is integrally formed the other end side arm portion 23a which extends obliquely upwardly outwards.

As shown in FIG. 3, the second link 24 is formed bifurcated with a pair of right and left band-plate like plate bodies 24a, 24b, as seen in a plan view. The pair of plate bodies 24a, 24b keep the spacing distance from each other at a position of the second link 24 coupled to the first link 23. At the area sandwiched by the pair of plate bodies 24a, 24b, a coupling pivot shaft 27 to be coupled with the first link 23 is pivotally supported. At the pivotal side end portion opposite to the coupling portion of the second link 24 relative to the first link 23, the drive wheel 10 is supported.

As shown in FIG. 3 and FIG. 4, there are provided the first hydraulic cylinder 6 capable of changing the pivotal posture of the first link 23 relative to the vehicle body 1 and the second hydraulic cylinder 7 capable of changing the pivotal posture of the second link 24 relative to the first link 23. The first hydraulic cylinder 6 and the second hydraulic cylinder 7 are disposed respectively in concentration in the vicinity of the first link 23.

The first link 23, the first hydraulic cylinder 6 and the second hydraulic cylinder 7 are disposed between the pair of plate bodies 24a, 24b of the second link 24 as seen in a plan view. The first hydraulic cylinder 6 is disposed on the inner side in the vehicle body front/rear direction relative to the first link 23 and provided to extend along the longitudinal direction of the first link 23. One end portion of the first hydraulic cylinder 6 is interlocked and coupled to a lower portion of the base end portion 22 via a first interlocking member 28 in the form of an arc. One end portion of the first hydraulic cylinder 6 is interlocked and coupled to a base end side portion of the first link 23 via a further second interlocking member 29. The first interlocking member 28 and the second interlocking member 29 have respective opposed end portions thereof pivotally coupled to be pivotable relative to each other. The other end portion of the first hydraulic cylinder 6 is interlocked and coupled to the other end side arm portion 23a formed integrally in the first link 23.

The second hydraulic cylinder 7 is disposed on the opposite side to the first hydraulic cylinder 6, namely, on the outer side in the vehicle body front/rear direction relative to the first link 23 and provided to extend substantially along the longitudinal direction of the first link 23. One end portion of the second hydraulic cylinder 7 is interlocked and coupled to the base end side arm portion 23b formed integrally in the base end side of the first link 23. The other end portion of the second hydraulic cylinder 7 is interlocked and coupled to the base end side arm portion 24c formed integrally in the base end side portion of the second link 23 via a third interlocking member 30. The other end portion of the second hydraulic cylinder 7 is interlocked and coupled also to a pivotal end side portion of the first link 23 via a further fourth interlocking member 31. The third interlocking member 30 and the fourth interlocking member 31 have respective opposed end portions thereof pivotally coupled to be pivotable relative to each other.

If the first hydraulic cylinder 6 is expanded/contracted when the second hydraulic cylinder 7 is stopped, the first link 23, the second link 24 and the traveling device 3 will be pivoted together about the horizontal axis X1 at the pivotal coupling portion relative to the base end portion 22 with maintaining the postures thereof relative to each other constant. If the second hydraulic cylinder 7 is expanded/contracted when the first hydraulic cylinder 6 is stopped, the second link 24 and the traveling device 3 will be pivoted together about a horizontal axis X2 at the coupling portion with the first link 23 and the second link 24 with maintaining the posture of the first link 21 relative to the vehicle body 1 constant.

As shown in FIGS. 1 and 2, the auxiliary wheel 11 is constituted of a wheel having an approximately equal outside diameter to that of the drive wheel 11 of the traveling device 3. As shown in FIG. 3, the coupling pivot shaft 27 that pivotally couples the first link 23 to the second link 24 is formed to protrude to more outer side in the vehicle body lateral width direction than the second link 24. And, to the extending protruding portion of the coupling support shaft 27, the auxiliary wheel 11 is rotatably supported. Namely, the coupling support shaft 27 that pivotally couples the first link 23 to the second link 24 is configured to act also as a pivot shaft for the auxiliary wheel 11, thus simplification of arrangement through component co-utilization being sought for.

If bolt coupling of the coupling member 18 to the front/rear oriented frame body 17 is released, it becomes possible to remove the bending link mechanism 4, the traveling device 3, the first hydraulic cylinder 6 and the second hydraulic cylinder 7, as being assembled to each other, from the vehicle body 1 altogether. Also, by bolt-coupling the coupling member 18 to the front/rear oriented frame body 17, it is possible to attach, the above respective devices as being assembled together to the vehicle body 1 altogether.

Work oil is fed from the work oil feeding device 8 to the first hydraulic cylinder 6 and the second hydraulic cylinder 7. With feeding and discharging of work oil by the hydraulic control unit 14 to expand and contract the first hydraulic cylinder 6 and the second hydraulic cylinder 7, the posture of the bending link mechanism 4 can be changed. Further, with feeding and discharging of work oil by the hydraulic control unit 14, a flow rate adjustment of work oil to the hydraulic motor 2 is effected, whereby the rotational speed of the hydraulic motor 2, namely, of the drive wheel 10 can be changed.

[Vehicle Body Split Arrangement]

As shown in FIG. 2, the vehicle body 1 is split or divided into a front side body section 1A including the right and left traveling devices 3 disposed on the front side and a rear side body section 1B including the right and left traveling devices 3 disposed on the rear side, and the front side body section 1A and the rear side body section 1B are coupled to each other to be bendably pivotable relative to each other via a pivot interlocking mechanism 32.

More particularly, the front side body section 1A and the rear side body section 1B respectively includes a support frame 16 in the form of a rectangular frame for supporting the section entirely. And, the support frame 16 of the front side body section 1A and the support frame 16 of the rear side body section 1B are coupled to each other via the pivot interlocking mechanism 32 provided at a front/rear intermediate portion. This pivot interlocking mechanism 32 is configured to allow not only a relative pivotal movement between the front side body section 1A and the rear side body section 1B about a vertical axis (the longitudinal axis of a coupling pin 33), but also a relative pivotal movement about a front/rear axis within a predetermined range as well as a relative pivotal movement about a horizontal axis within a predetermined range.

As this pivot interlocking mechanism 32, as shown in FIGS. 1 and 2, it is possible to employ one having a similar arrangement to that of a coupler used at a coupling portion of a standard trailer. Namely, either one of the front side body section 1A and the rear side body section 1B is provided with the vertically oriented coupling pin 33, whereas the other thereof is provided with a round-shaped coupling member 34 to be fitted on the coupling pin 33 to be operably coupled therewith. The inside diameter of the coupling member 34 is set greater than the outside diameter of the coupling pin 33, thus forming a "play" therebetween. With this, the relative pivotal movement about the vertical axis between the front side body section 1A and the rear side body section 1B is allowed, and also the relative pivotal movement about the front/rear oriented axis within the predetermined range between the front side body section 1A and the rear side body section 1B is also allowed.

And, the rear side body section 1B is provided with a rear section side hydraulic control unit 14B having an engine 12, a hydraulic pump 13, and a hydraulic valve associated with each of the two first hydraulic cylinders 6, the two second hydraulic cylinders 7 and the two hydraulic motors 2 in the rear side body section 1B. And, the front side body section 1A is provided with a front section side hydraulic control unit 14A having a hydraulic pump associated with each of the two first hydraulic cylinders 6, the two second hydraulic cylinders 7 and the two hydraulic motors 2 in the front side body section 1A. Feeding of work oil from the hydraulic pump 13 to the front section hydraulic control unit 14A is effected via an unillustrated hydraulic hose. This hydraulic hose can feed work oil while allowing bending/pivoting of the vehicle body 1.

As shown in FIG. 1, this work vehicle includes various sensors. Specifically, each one of the plurality of first hydraulic cylinders 6 includes a first head side pressure sensor S1 and a first cap side (remote-from-head side) pressure sensor S2; and each one of the plurality of second hydraulic cylinders 7 includes a second cap side pressure sensor S3 and a second head side (remote-from-cap side) pressure sensor S4. The first head side pressure sensor S1 detects an oil pressure of the head side chamber of the first hydraulic cylinder 6. The first cap side pressure sensor S2 detects an oil pressure of the cap side chamber of the first hydraulic cylinder 6. The second cap side pressure sensor S3 detects an oil pressure of the cap side chamber of the second hydraulic cylinder 7. The second head side pressure sensor S4 detects an oil pressure of the head side chamber of the second hydraulic cylinder 7. Further, though not shown, each hydraulic cylinder 6, 7 described above incorporates a stroke sensor capable of detecting an expansion/contraction stroke amount and is configured to feedback its operational state to the control device 9.

Incidentally, it is noted that the attachment positions of the respective pressure sensors S1, S2, S3, S4 are not limited to those described above. These respective pressure sensors S1, S2, S3, S4 need only to be capable of detecting (estimating) the oil pressure of the cap side chamber or the head side chamber corresponding thereto, thus may be disposed in a pipe extending from the valve mechanism to the corresponding cap side or head side chamber.

Based on detection results from these sensors, a force needed for supporting the vehicle body 1 is calculated and based on this result, feeding of work oil to the respective first hydraulic cylinder 6 and second hydraulic cylinder 7 will be controlled. Specifically, based on a detection value of the first head side pressure sensor S1 and a detection value of the first cap side pressure sensor S2, from a pressure difference between the cap side chamber and the head side chamber of the first hydraulic cylinder 6, a cylinder propelling force for the first hydraulic cylinder 6 will be calculated. Further, based on a detection value of the second cap side pressure sensor S3 and a detection value of the second head side pressure sensor S4, like the first hydraulic cylinder 6, a cylinder propelling force for the second hydraulic cylinder 7 will be calculated.

The vehicle body 1 includes an acceleration sensor S5 constituted of e.g. a triaxial acceleration sensor or the like. Based on a detection result of the acceleration sensor S5, tilts of the vehicle body 1 to the front/rear sides and right/left sides are detected. And, based on the result, the posture of the vehicle body 1 is controlled. Namely, in order to allow the posture of the vehicle body 1 to become a target posture, feeding of work oil to the respective first hydraulic cylinder 6 and second hydraulic cylinder 7 will be controlled.

The traveling device 3 includes a rotation sensor S6 for detecting a rotational speed of the drive wheel 10. In operation, based on a rotational speed of the drive wheel 10 calculated by the rotation sensor S6, feeding of work oil to the hydraulic motor 2 will be controlled in such a manner that the rotational speed of the drive wheel 10 may become a target value.

As described above, the work vehicle according to the instant embodiment is configured such that the traveling devices 3 are supported via the bending link mechanisms 4 and also that the postures of the bending link mechanisms 4 are changed by the hydraulic cylinders 6, 7. Moreover, driving of traveling is done by the hydraulic motor 2 also. Therefore, the work vehicle is suitable for an agricultural work as being robust against adverse influence from water content, fine dust or the like, unlike an electric motor for instance.

Figure 8:
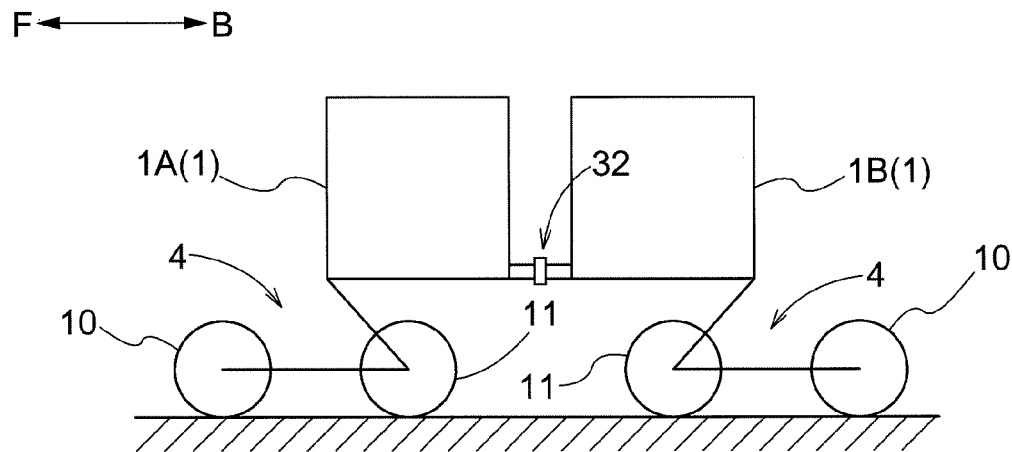
FIG. 8 is an explanatory view showing a flat ground traveling state.

In the case of traveling on a flat ground surface, as shown in FIG. 8, a four-wheel traveling mode is possible in which all of the four drive wheels 10 and the four auxiliary wheels 11 are placed in contact with the ground surface. In this case, the traveling will be effected with displacing the first links 23 toward the vehicle body inner side in the front/rear direction. With this arrangement, it is possible to render the front/rear width of the entire vehicle body compact, thus making the turning radius smaller.

Figure 9:
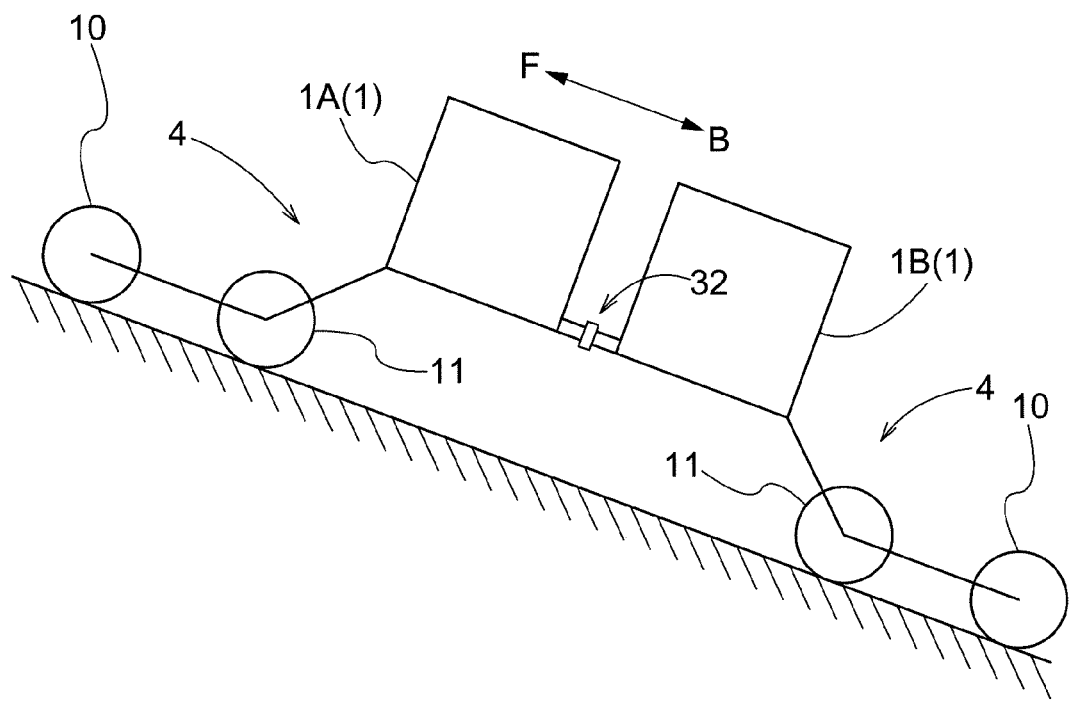
FIG. 9 is an explanatory view showing a slope traveling state.

As shown in FIG. 9, in the case of traveling on a slope, the postures of the bending link mechanisms 4 will be changed to extended postures in which the four drive wheels 10 and the four auxiliary wheels 11 are located on more outer side in the vehicle body front/rear direction than the outer end portion in the vehicle body front/rear direction. Then, while the drive wheels 10 and the auxiliary wheels 11 are all placed in contact with the ground surface, the first links 23 and the second links 24 are moved as close as possible to the horizontal posture, to reduce the height of the vehicle body 1 to a lower position. In this state, the vehicle travels while riding over the slope. In this traveling mode, with the increased ground contact width along the front/rear direction, even on a steeply inclined slope, stable traveling without falling is possible.

And, in the case of traveling on a flat ground surface, when the vehicle body is to be turned to either right or left side, based on a speed difference between the right and left traveling devices 3 included in the front side body section 1A and the rear side body section 1B whichever section is located on the leading side in the advancing direction, the bending pivot angle between the front side body section 1A and the rear side body section 1B is changed.

Figure 7:
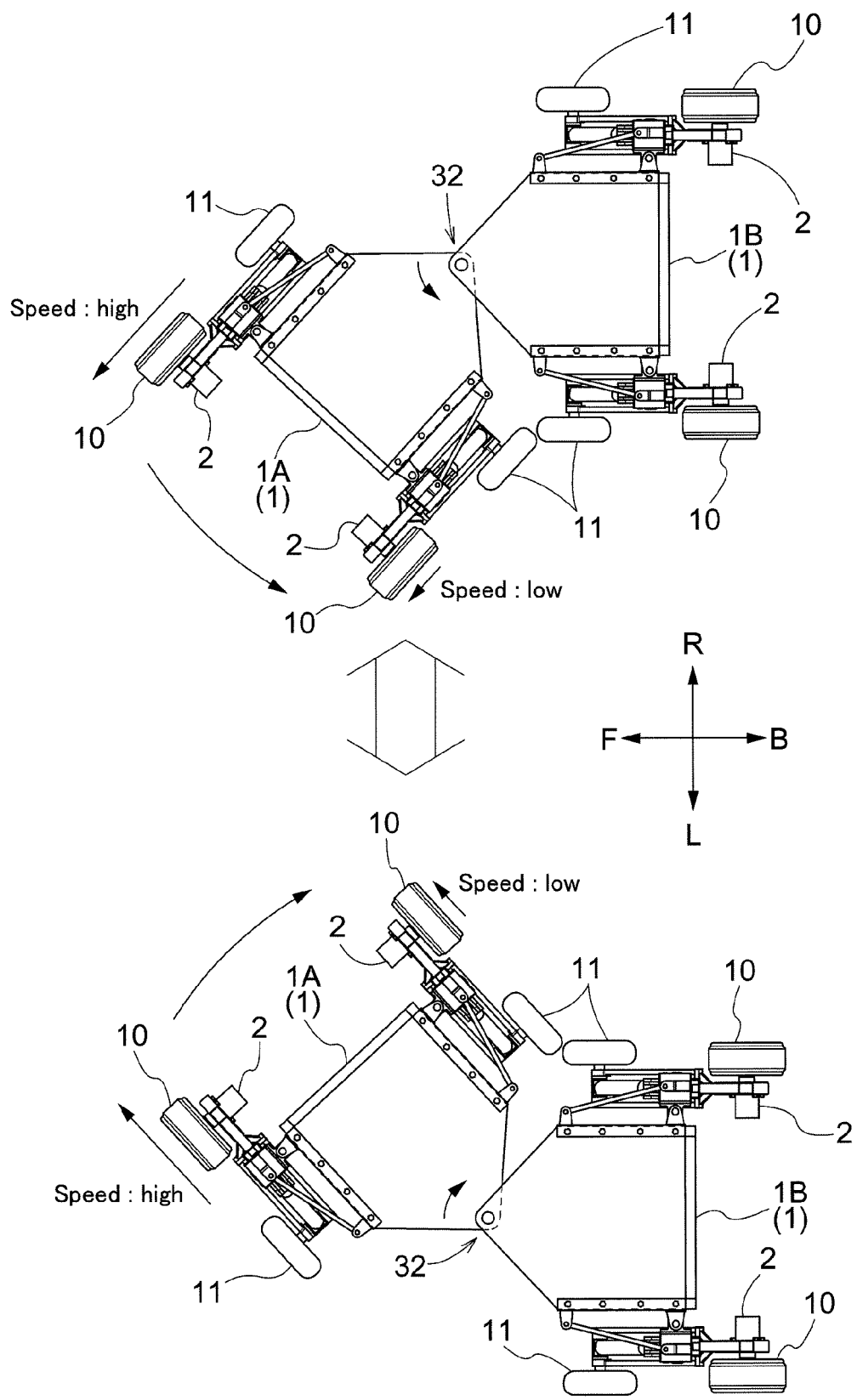
FIG. 7 is a plan view showing a turn traveling state.

As shown in FIG. 7, when a turning in the left direction is to be made with respect to the vehicle body advancing direction, the rotational speed of the right drive wheel 10 of the front side body section 1A will be set high and the rotational speed of the left drive wheel 10 will be set low, thus providing a speed difference therebetween. Also, when a turning in the right direction is to be made with respect to the vehicle body advancing direction, the rotational speed of the left drive wheel 10 of the front side body section 1A will be set high and the rotational speed of the right drive wheel 10 will be set low, thus providing a speed difference therebetween. And, the magnitude of such speed difference will be set in accordance with the magnitude of the target turning angle.

In the case of straight traveling on a flat ground surface, the rotational speeds of the right and left drive wheels 10 will be set equal. In this case, however, it is advantageous to set the drive speeds of the drive wheels of the leading one of the front side body section 1A and the rear side body section 1B somewhat higher than the drive speeds of the drive wheels of the trailing side section. With this arrangement, straight traveling is facilitated even with the body bending type vehicle body 1.

Because the pivot interlocking mechanism 32 is configured to provide a relative pivotal movement about the front/rear axis within a predetermined range between the front side body section 1A and the rear side body section 1B and also to provide a relative pivotal movement about the horizontal axis therebetween within a predetermined range, in the case of traveling on a rugged ground surface or the like, traveling is possible with the respective traveling devices 3 of the front side body section 1A and the rear side body section 1B smoothly following the undulation or unevenness of the ground surface.

Figure 10:
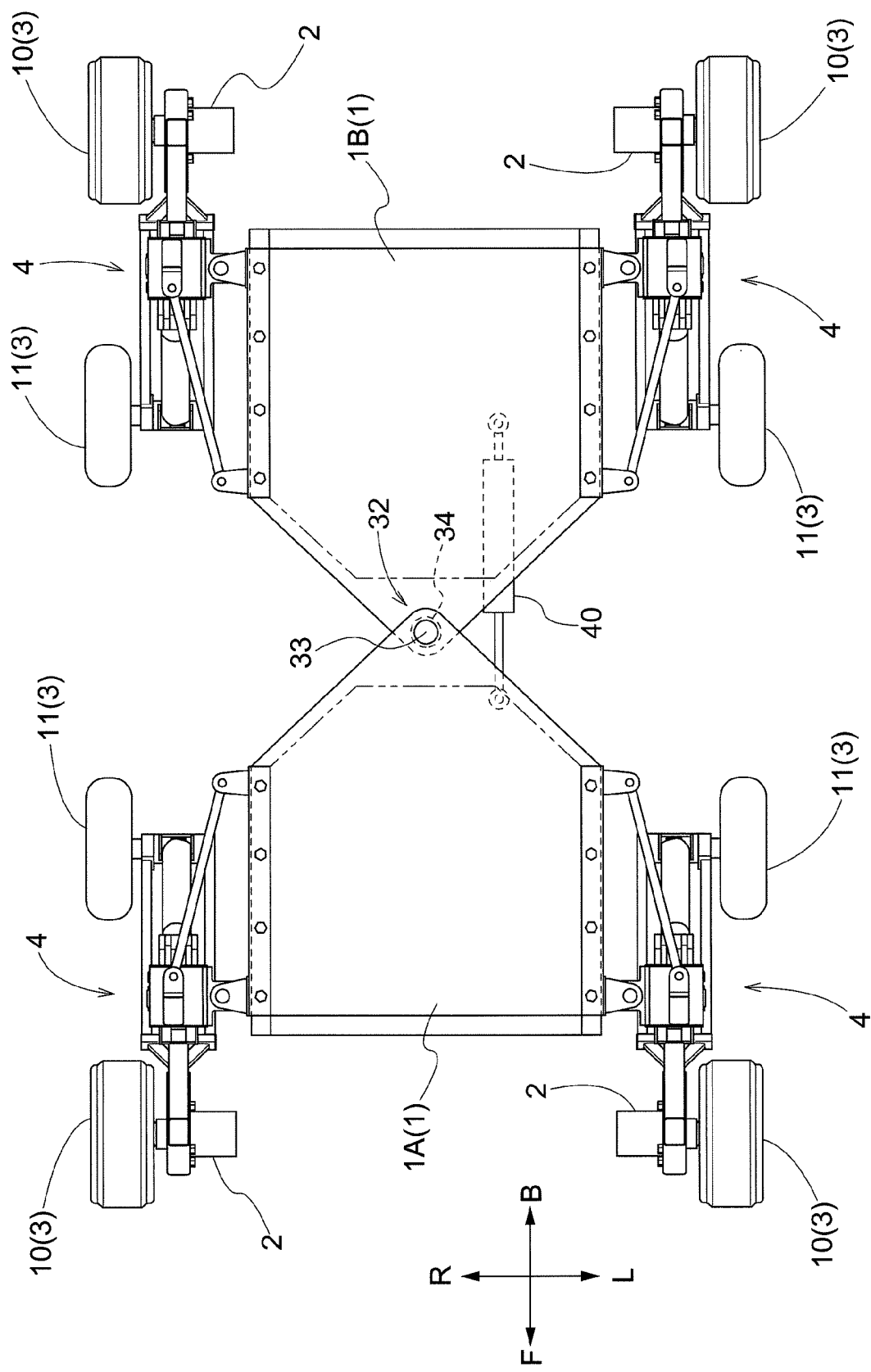
FIG. 10 is an overall plan view of a work vehicle according to a further embodiment.

Modified Embodiments of First Embodiment (1) In the foregoing embodiment, the bending pivot angle between the front side body section 1A and the rear side body section 1B is changed based on a speed difference between driving speeds of the right and left traveling devices 3 (drive wheels 10). In place of this arrangement, it is possible to provide an actuator capable of changing the bending pivot angle between the front side body section 1A and the rear side body section 1B. For instance, as shown in FIG. 10, in such arrangement, at an opposed portion between the front side body section 1A and the rear side body section 1B, a turning hydraulic cylinder 40 (an example of the "actuator") will be pivotally coupled. With an expansion/contraction operation of this turning hydraulic cylinder 40, the bending pivot angle between the front side body section 1A and the rear side body section 1B can be changed. And, an arrangement will be made such that an expansion/contraction stroke amount of the turning hydraulic cylinder 40 is detected by a stroke sensor incorporated therein and is fed back to the control device 9. The turning hydraulic cylinder 40 is controlled based on instruction information by the control device 9 so as to provide an expansion/contraction stroke amount corresponding to the turning angle. In place of the hydraulic cylinder 40, a hydraulic motor can be employed also.

(2) In the foregoing embodiment, the first hydraulic cylinder 6 has its cylinder tube side pivotally coupled to the coupled portion (base end portion 22) on the vehicle body side and has its piston rod side pivotally coupled to the coupled portion (other end side arm portion 23a) on the first link 23 side. In place of this arrangement, the first hydraulic cylinder 6 may have its cylinder tube side pivotally coupled to the coupled portion (other end side arm portion 23a) on the first link 23 side and have its piston rod side pivotally coupled to the coupled portion (base end portion 22) on the vehicle body side.

(3) In the foregoing embodiment, as the drive operating device 5, the hydraulic cylinders 6, 7 are provided. In place of this arrangement, it is also possible to provide a hydraulic motor at the pivot portion of the bending link mechanism 4, so that the posture of the bending link mechanism 4 may be changed by this hydraulic motor.

(4) In the foregoing embodiment, the pivot interlocking mechanism 32 is configured to allow not only the relative pivotal movement about the vertical axis, but also the relative pivotal movement between the front side body section 1A and the rear side body section 1B about the front/rear axis with a predetermined range, as well as the relative pivotal movement about the horizontal axis within a predetermined range. In place of this arrangement, the mechanism may be configured to allow only the relative pivotal movement between the front side body section 1A and the rear side body section 1B about the vertical axis, but not allowing the relative pivotal movement about the front/rear axis or the relative pivotal movement about the horizontal axis. With this arrangement, traveling with setting the auxiliary wheels 11 afloat is possible and traveling with keeping the ground clearance of the vehicle body 1 high with large extensions of the bending link mechanisms 4 is possible.

(5) In the foregoing embodiment, each traveling device 3 is driven by the hydraulic motor 2. In place of this arrangement, it is also possible to arrange e.g. such that power of an engine mounted on the vehicle is supplied to the drive wheel 8 via a mechanical power transmission mechanism such as a chain transmission mechanism.

(6) In the foregoing embodiment, the traveling device 3 includes the drive wheel 10. In place of this arrangement, it is also possible to arrange such that as the traveling device, there is provided a crawler traveling device with a crawler belt wound around a plurality of wheel bodies.

(7) In the foregoing embodiment, the vehicle body 1 is split into the two sections in the front/rear direction. In place of this arrangement, it is also possible to arrange such that the vehicle body is split into three or more sections which are coupled to each other to form an articulated coupling arrangement.

(8) In the foregoing embodiment, a four-leg, four-wheel robot of hydraulic electronic control type was used as an example of "work vehicle". However, the present invention is not limited to the configuration shown in the drawings.

Second Embodiment

Figure 11:
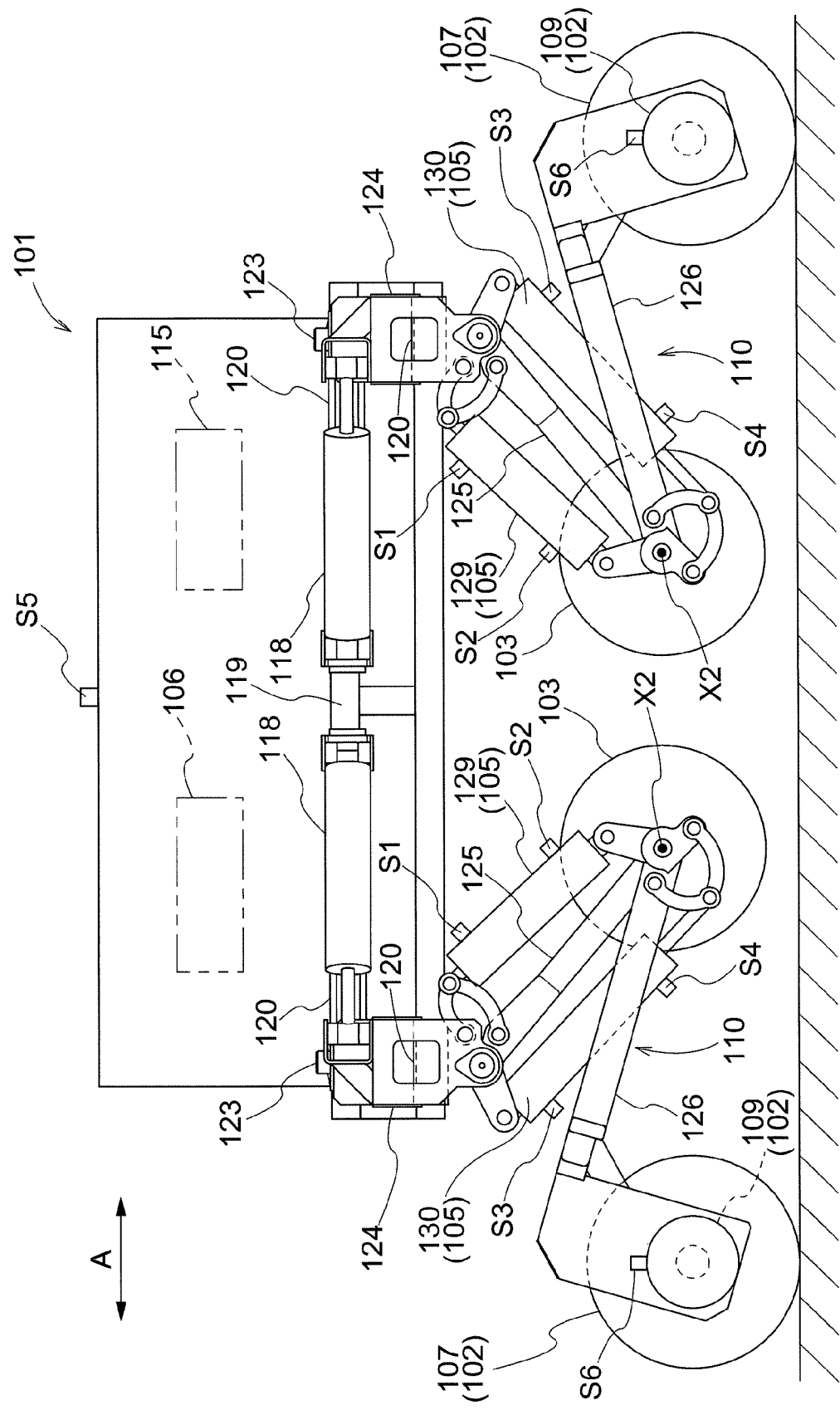
FIG. 11 is a view showing a second embodiment (applied also to the drawings up to FIG. 27) and an overall side view of a work vehicle.
Figure 12:
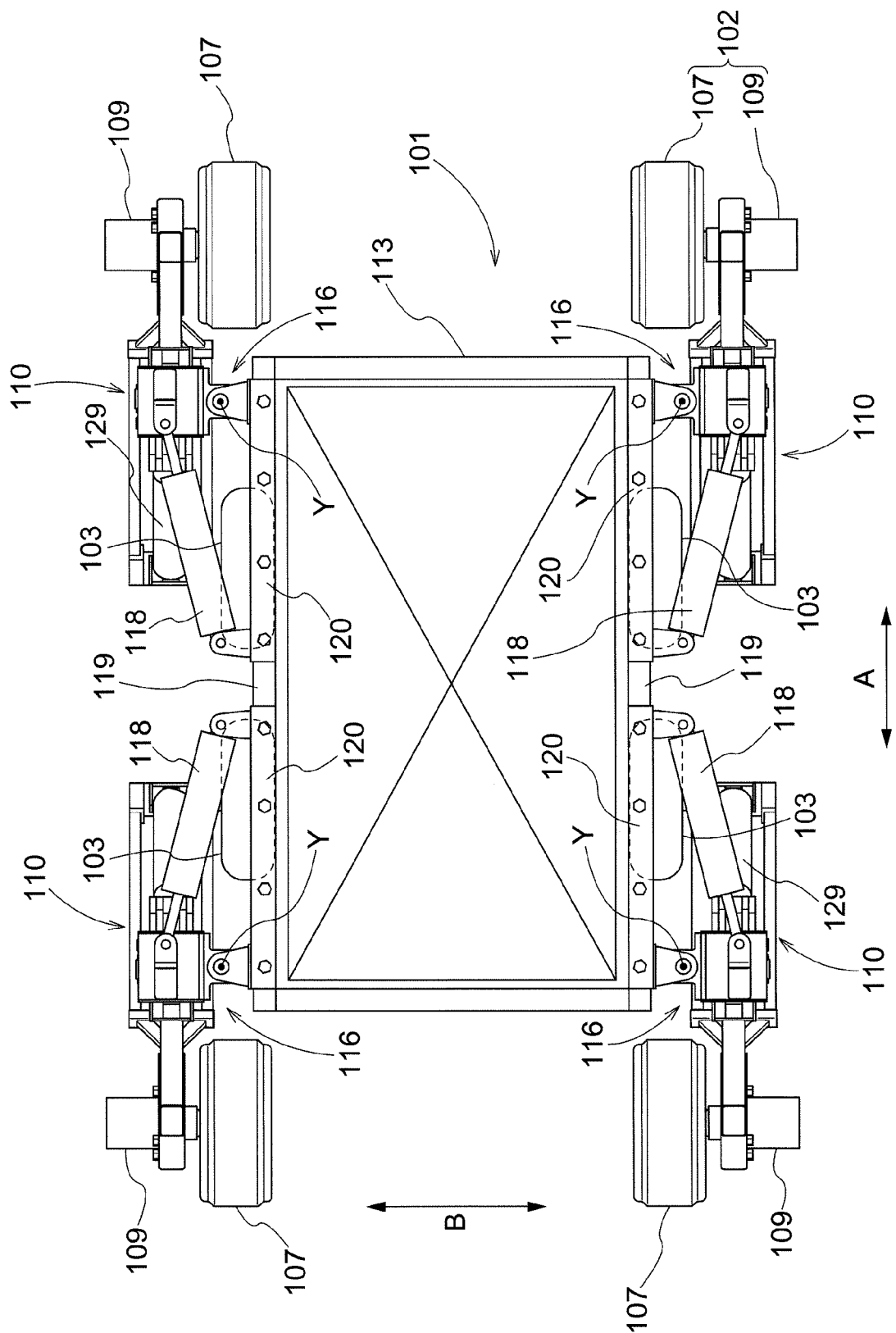
FIG. 12 is an overall plan view of the work vehicle.

As shown in FIGS. 11 and 12, a work vehicle includes a vehicle body 101 in the form of an approximately rectangular frame for supporting the entire vehicle, a plurality of (specifically four) traveling devices 102, a plurality of auxiliary wheels 103 provided in correspondence with the plurality of traveling devices 102 respectively, vehicle body supporting portions (bending link mechanisms 110) for supporting the plurality of traveling devices 102 to the vehicle body 101 with allowing changes of positions thereof, hydraulic driving type drive mechanisms 105 (an example of "drive operating device") capable of variably operating the bending link mechanisms 110, and a work oil feeding device 106 for feeding work oil to the drive mechanisms 105. Each one of the plurality of traveling devices 102 includes a drive wheel 107 and a hydraulic motor 109 incorporated within a bearing portion of the drive wheel 107.

In this embodiment, when definitions are to be made for the front and rear sides of the vehicle body, these definitions are made along the vehicle body advancing direction. When definitions are to be made in the right/left direction of the vehicle body, these definitions are made as seen in the vehicle body advancing direction. Namely, the direction denoted with a sign (A) in FIG. 11 represents the vehicle body front/rear direction and the direction denoted with a sign (B) in FIG. 12 represents the vehicle body right/left direction.

The drive mechanisms 105 are capable of changing the postures of the plurality of bending mechanisms 110 respectively. At an intermediate bending portion 111 (see FIG. 14) of each one of the plurality of bending mechanisms 110, the auxiliary wheel 103 is rotatably supported. Therefore, the bending link mechanism 110, the drive wheel 107 and the auxiliary wheel 103 are respectively provided on right and left pair for each side of the front and rear opposed sides.

The vehicle body 101 includes a support frame 113 in the form of a rectangular frame that surrounds the entire circumference of the vehicle body 101 and that also supports it entirely. The work oil feeding device 106 is accommodated and supported inside the vehicle body 101. Though not described in detail herein, the work oil feeding device 106 includes a hydraulic pump driven by an engine and feeding work oil to the drive mechanisms 105, a plurality of hydraulic control valves for controlling work oil fed from the hydraulic pump to the drive devices 105, a work oil tank, etc. and effects feeding and discharging of the work oil to/from the drive mechanisms 105, adjustment of its flow rate/amount, etc.

Inside the vehicle body 101, there is mounted a control device 115 for controlling operations of the work oil feeding device 106. Control operations by the control device 115 will not be detailed herein. Briefly, based on instruction information inputted via a manual input device (e.g. a remote controller, etc.) or preset and prestored instruction information, feeding states of work oil to the drive mechanisms 105 and the hydraulic motors 109 are controlled.

Next, a support arrangement for supporting the drive wheels 107 to the vehicle body 101 will be described.

The plurality of (specifically, four) drive wheels 107 are supported to the vehicle body 101 to be liftable up/down via the four sets of bending link mechanisms 110. Each bending link mechanism 110 is supported to the vehicle body 101 with its orientation being changeable about a vertical axis by a turning mechanism 116. Namely, the right and left turning mechanisms 116 can change the orientations of the respective bending link mechanisms 110 disposed in opposition to each other in the vehicle body right/left direction about a vertical axis to different directions.

The bending link mechanism 110 is supported to a support frame 113 to be pivotable about a vertical axis Y via the turning mechanism 116. The turning mechanism 116 includes a vehicle body side supporting portion 117 (see FIG. 13 and FIG. 14) which is coupled to the support frame 113 and which also pivotally supports the bending link mechanism 110 and a turning hydraulic cylinder (an example of "turning operating device", to be referred to as "turning cylinder 118" hereinafter) for turning the bending link mechanism 110.

More particularly, as shown in FIGS. 13-16, the vehicle body side supporting portion 117 includes: a coupling member 120 which engages by sandwiching a pair of upper and lower front/rear oriented frame bodies 119 in the form of angular cylinders provided at lateral portions of the support frame 113 to be removably bolt-connected thereto; an outer side pivot bracket 121 disposed at an outer side portion in the vehicle body front/rear direction of the coupling member 120; an inner side pivot bracket 122 disposed at an inner side portion in the vehicle body front/rear direction of the coupling member 120; and a vertically oriented pivot shaft 123 supported to the outer side pivot bracket 121, whereby the vehicle body side supporting portion 117 supports the bending link mechanism 110 with allowing pivotal movements thereof about the vertical axis Y of the pivot shaft 123.

The bending link mechanism 110 includes a base end portion 124 which has its position in the vertical direction fixed and which is supported to the vehicle body side supporting portion 117 to be pivotable about the vertical axis Y, a first link 125 having one end portion thereof supported to a lower portion of the base end portion 124 to be pivotable about a horizontal axis X1, and a second link 126 having one end portion thereof supported to the other end portion of the first link 125 to be pivotable about a horizontal axis X2 and having the other end portion thereof supported to the drive wheel 107.

More particularly, the base end portion 124 is provided in the form of a rectangular frame as seen in a plan view and is supported to the outer side pivot bracket 121 of the vehicle body side supporting portion 117 to be pivotable about the vertical axis Y via the pivot shaft 123. The turning cylinder 118 has one end portion thereof pivotally coupled to the inner side pivot bracket 122, and has the other end portion thereof pivotally coupled to a portion of the base end portion 124 at a position laterally displaced relative to the pivot shaft 123.

A support shaft 127 provided at one end of the first link 125 is pivotally supported between and across right and left opposed sides of the base end portion 124, so that the first link 125 is coupled to the lower portion of the base end portion 124 to be pivotable about the axis of the support shaft 127.

Figure 14:
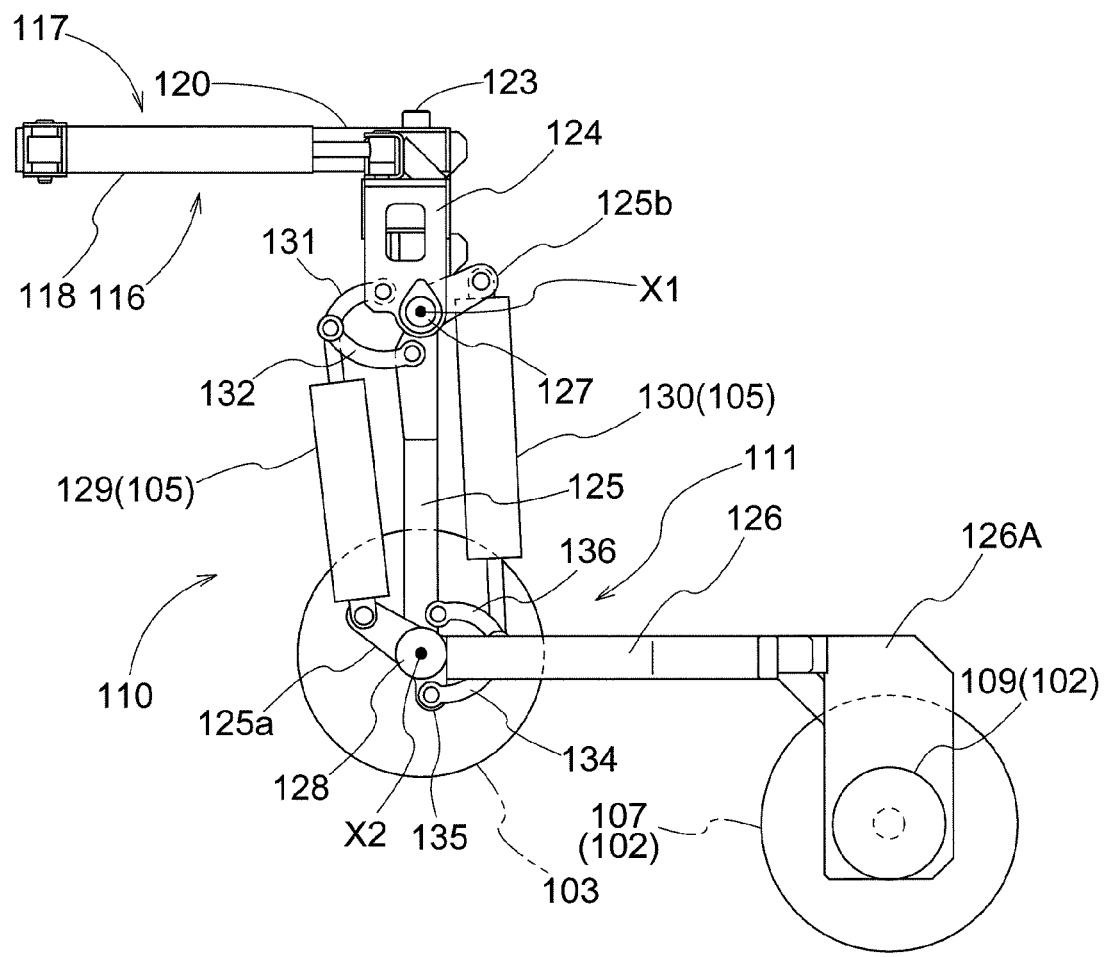
FIG. 14 is a side view of the bending link mechanism.

As shown in FIG. 14, the first link 125 includes a base end side arm portion 125*b* and an other end side arm portion 125*a*. At one end side portion of the first link 125, there is integrally formed the base end side arm portion 125*b* which extends obliquely outwardly upwards. At the other end side portion of the first link 125, there is integrally formed the other end side arm portion 125*a* which extends obliquely upwardly outwards.

Figure 13:
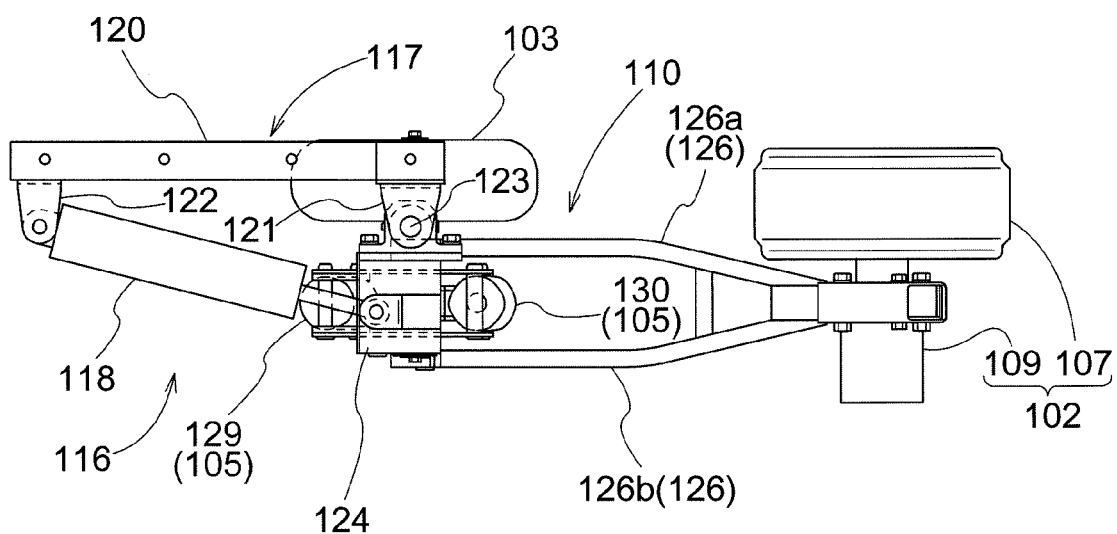
FIG. 13 is a plan view of a bending link mechanism.

As shown in FIG. 13, the second link 126 is formed bifurcated with a pair of right and left band-plate like plate bodies 126*a*, 126*b*, as seen in a plan view. The pair of plate bodies 126*a*, 126*b* keep the spacing distance from each other at a position of the second link 126 connected to the first link 125. At the area sandwiched by the pair of plate bodies 126*a*, 126*b*, a coupling pivot shaft 128 to be coupled with the first link 125 is pivotally supported. At the pivotal side end portion opposite to the coupling portion of the second link 126 relative to the first link 125, the drive wheel 107 is supported. As shown in FIG. 14, at the pivotal side end portion of the second link 126, there is formed an L-shaped extension portion 126A that extends in a form of L-shape approximately in the direction away from the vehicle body 101 and at the extension end portion of this L-shaped extension portion 126A, the drive wheel 107 is supported.

Figure 15:
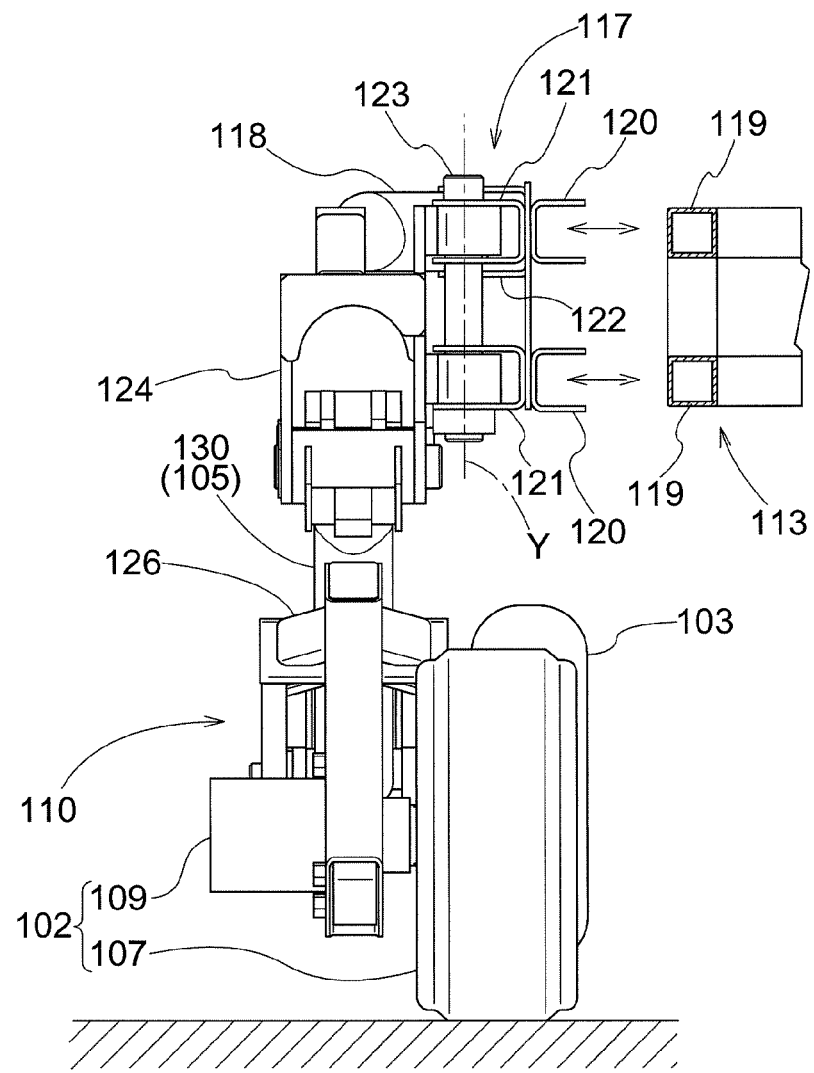
FIG. 15 is a front view showing an attachment state of the bending link mechanism under a removed state.
Figure 16:
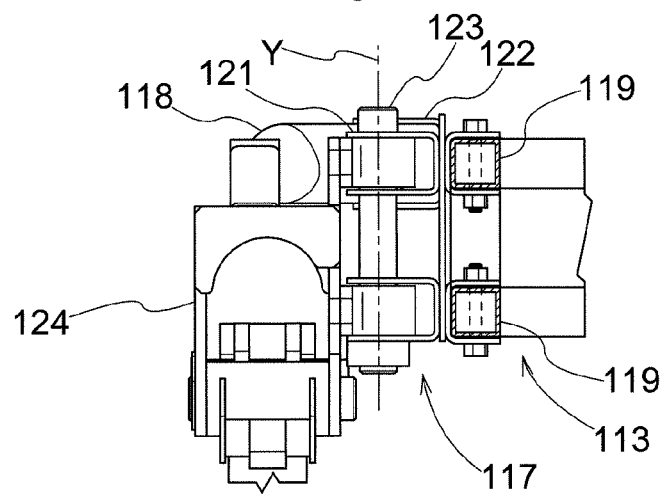
FIG. 16 is a front view showing an attachment state of the bending link mechanism under an attached state.

As shown in FIG. 11, FIG. 13 and FIG. 15, the drive wheel 107 is supported as being located on the vehicle body inner side in the right/left direction relative to the bending link mechanism 110. Specifically, at the pivotal end portion of the second link 126, it is supported to be located on the vehicle body inner side in the right/left direction. The hydraulic motor 109 is supported to be disposed on the vehicle body outer side (the side opposite to the drive wheel 107) in the right/left direction, at the pivotal end portion of the second link 126.

For each one of the plurality of bending link mechanisms 110, the drive mechanism 105 is provided. As shown in FIG. 11 and FIG. 14, the drive mechanism 105 includes a first hydraulic cylinder 129 capable of changing the pivotal posture of the first link 125 relative to the vehicle body 101, and a second hydraulic cylinder 130 capable of changing the pivotal posture of the second link 126 relative to the first link 125. The first hydraulic cylinder 129 and the second hydraulic cylinder 130 are disposed in concentration in the vicinity of the first link 125 respectively.

The first link 125, the first hydraulic cylinder 129 and the second hydraulic cylinder 130 are disposed between the pair of plate bodies 126*a*, 126*b* of the second link 126 as seen in the plan view. As shown in FIGS. 13 and 14, the first hydraulic cylinder 129 is disposed on the vehicle body front/rear direction inner side relative to the first link 125 and provided along the longitudinal direction of the first link 125. One end portion of the first hydraulic cylinder 129 is interlocked and coupled to the base end portion 124 via a first interlocking member 131 in an arcuate form. One end portion of the first hydraulic cylinder 129 is interlocked and coupled to the base end side portion of the first link 125 via a further second interlocking member 132. The first interlocking member 131 and the second interlocking member 132 have respective opposed ends thereof pivotally coupled to each other to be pivotable relative to each other. The other end portion of the first hydraulic cylinder 129 is interlocked and coupled to the other end side arm portion 125*a* formed integrally in the first link 125.

The second hydraulic cylinder 130 is disposed on the opposite side to the first hydraulic cylinder 129, namely, on the vehicle body front/rear direction outer side relative to the first link 125 and provided along the longitudinal direction of the first link 125. One end portion of the second hydraulic cylinder 130 is interlocked and coupled to the base end side arm portion 125*b* formed integrally at the base end side of the first link 125. The other end portion of the second hydraulic cylinder 130 is interlocked and coupled to the arm portion 135 formed integrally at the base end side portion of the second link 126 via a third interlocking member 134. The other end portion of the second hydraulic cylinder 130 is interlocked and coupled also to the pivotal end side portion of the first link 125 via a further fourth interlocking member 136. The third interlocking member 134 and the fourth interlocking member 136 have respective opposed ends thereof pivotally coupled to be pivotable relative to each other.

If the first hydraulic cylinder 129 is expanded/contracted when the second hydraulic cylinder 130 is stopped, the first link 125, the second link 126 and the drive wheel 107 will be pivoted together about the horizontal axis X1 at the pivotal coupling portion relative to the base end portion 124 with maintaining the postures thereof relative to each other constant. If the second hydraulic cylinder 130 is expanded/contracted when the first hydraulic cylinder 129 is stopped, the second link 126 and the drive wheel 107 will be pivoted together about a horizontal axis X2 at the coupling portion with the first link 125 and the second link 126 with maintaining the posture of the first link 125 relative to the vehicle body 101 constant.

At the intermediate bending portion 111 of each one of the plurality of bending link mechanisms 110, the auxiliary wheel 103 is supported to be freely rotatable. As shown in FIGS. 11 and 12, the auxiliary wheel 103 is constituted of a wheel having an approximately equal outside diameter to that of the drive wheel 107. As shown in FIG. 13, the coupling pivot shaft 128 that pivotally couples the first link 125 to the second link 126 is formed to extend to protrude to more outer side in the vehicle body lateral width direction than the second link 126. Namely, the coupling pivot shaft 128 that pivotally couples the first link 125 to the second link 126 is configured to act also as a pivot shaft for the auxiliary wheel 103, thus simplification of arrangement through component co-utilization being sought for.

Figure 17:
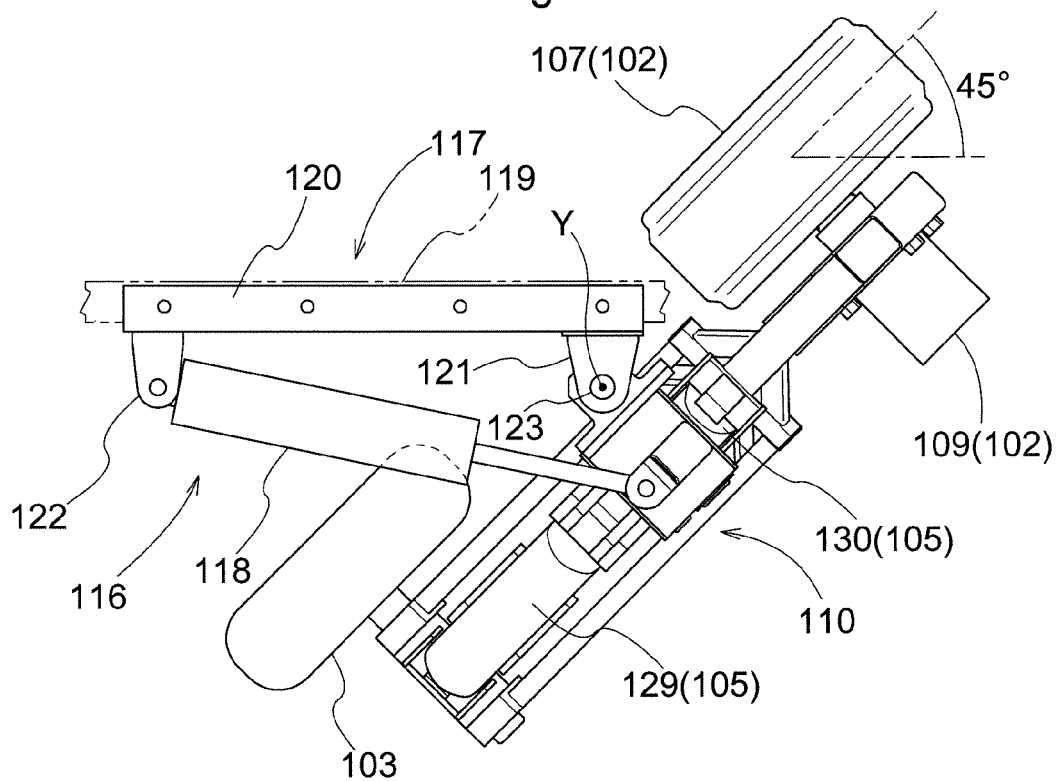
FIG. 17 is a plan view showing a left turning state by a turning mechanism.
Figure 18:
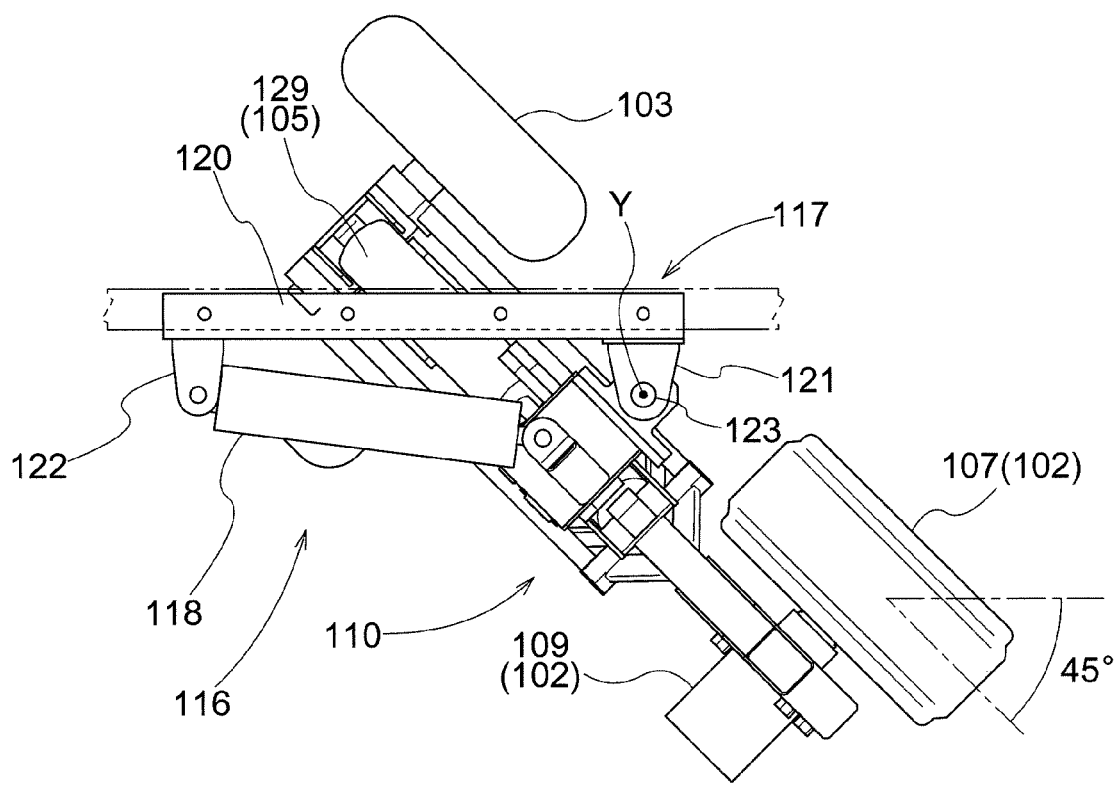
FIG. 18 is a plan view showing a right turning state by the turning mechanism.

As shown in FIGS. 17 and 18, the bending link mechanism 110, the drive wheel 107, the auxiliary wheel 103 and the drive mechanism 105 respectively are supported to the outer side pivot bracket 121 to be pivotable together about the vertical axis Y of the pivot support shaft 123. And, these will be pivotally operated together by expanding/contracting the turning cylinder 118. Turning operation is possible for each increment of 45 degrees from a straight traveling state in which the drive wheel 107 is oriented in the front/rear direction to the left turning direction and the right turning direction, respectively.

If bolt coupling of the coupling member 120 to the front/rear oriented frame body 119 is released, it becomes possible to remove the turning mechanism 116, the bending link mechanism 110, the drive wheel 107, the auxiliary wheel 103 and the drive mechanism 105, as being assembled to each other, from the vehicle body 101 altogether. Also, by bolt-coupling the coupling member 120 to the front/rear oriented frame body 119, it is possible to attach, the above respective devices as being assembled together, to the vehicle body 101 altogether.

Work oil is fed from the work oil feeding device 106 to the first cylinder 129 and the second cylinder 130 of the respective one of the plurality of bending link mechanisms 110. With feeding and discharging of work oil by the hydraulic control valves, the first hydraulic cylinder 129 and the second hydraulic cylinder 130 can be expanded/contracted. The hydraulic control valves are controlled by the control device 115.

Also, with flow rate adjustment of the work oil executed by the hydraulic control valves associated with the hydraulic motor 109, the rotational speed of the hydraulic motor 109, i.e. of the drive wheel 107, can be changed. The hydraulic control valves are controlled by the control device 115, based on control information inputted via a manual operation or preset and stored control information.

As shown in FIG. 11, this work vehicle includes various sensors. Specifically, the work vehicle includes a first head side pressure sensor S1 and a first cap side (remote-from-head side) pressure sensor S2 included in the respective first hydraulic cylinder 129; and a second cap side pressure sensor S3 and a second head side (remote-from-cap side) pressure sensor S4 included in the respective second hydraulic cylinder 130. The first head side pressure sensor S1 detects an oil pressure of the head side chamber of the first hydraulic cylinder 129. The first cap side pressure sensor S2 detects an oil pressure of the cap side chamber of the first hydraulic cylinder 129. The second cap side pressure sensor S3 detects an oil pressure of the cap side chamber of the second hydraulic cylinder 130. The second head side pressure sensor S4 detects an oil pressure of the head side chamber of the second hydraulic cylinder 130. Further, though not shown, each hydraulic cylinder described above (the turning cylinder 118, the first hydraulic cylinder 129 and the second hydraulic cylinder 130) incorporates a stroke sensor capable of detecting an expansion/contraction stroke amount and is configured to feedback its operational state to the control device 115.

Incidentally, it is noted that the attachment positions of the respective pressure sensors S1, S2, S3, S4 are not limited to those described above. These respective pressure sensors S1, S2, S3, S4 need only to be capable of detecting (estimating) the oil pressure of the cap side chamber or the head side chamber corresponding thereto, thus may be disposed in a pipe extending from the valve mechanism to the corresponding cap side or head side chamber.

Based on detection results from these sensors, a force needed for supporting the vehicle body 101 is calculated and based on this result, feeding of work oil to the respective first hydraulic cylinder 129 and second hydraulic cylinder 130 will be controlled. Specifically, based on a detection value of the first head side pressure sensor S1 and a detection value of the first cap side pressure sensor S2, from a pressure difference between the cap side chamber and the head side chamber of the first hydraulic cylinder 129, a cylinder propelling force for the first hydraulic cylinder 129 will be calculated. Further, based on a detection value of the second cap side pressure sensor S3 and a detection value of the second head side pressure sensor S4, like the first hydraulic cylinder 129, a cylinder propelling force for the second hydraulic cylinder 130 will be calculated.

The vehicle body 101 includes an acceleration sensor S5 constituted of e.g. a triaxial acceleration sensor or the like. Based on a detection result of the acceleration sensor S5, tilts of the vehicle body 101 to the front/rear sides and right/left sides are detected. And, based on the result, the posture of the vehicle body 101 is controlled. Namely, in order to allow the posture of the vehicle body 101 to become a target posture, feeding of work oil to the respective first hydraulic cylinder 129 and second hydraulic cylinder 130 will be controlled.

The drive wheel 107 includes a rotation sensor S6 for detecting a rotational speed of the drive wheel 107. In operation, based on a rotational speed of the drive wheel 107 calculated by the rotation sensor S6, feeding of work oil to the hydraulic motor 109 will be controlled in such a manner that the rotational speed of the drive wheel 107 may become a target value.

As described above, the work vehicle according to the instant embodiment is configured such that the drive wheels 107 are supported via the bending link mechanisms 110 and also that the postures of the bending link mechanisms 110 are changed by the hydraulic cylinders (the first hydraulic cylinders 129 and the second hydraulic cylinders 130) as the hydraulic driving type drive mechanisms 105. Moreover, driving of traveling is done by the hydraulic motor also. Therefore, the work vehicle is suitable for an agricultural work as being robust against adverse influence from water content, fine dust or the like, unlike an electric motor for instance.

As examples of use of the work vehicle having the above-described configuration, the following traveling modes can be cited.

<Traveling on Flat Ground Surface>

Figure 19:
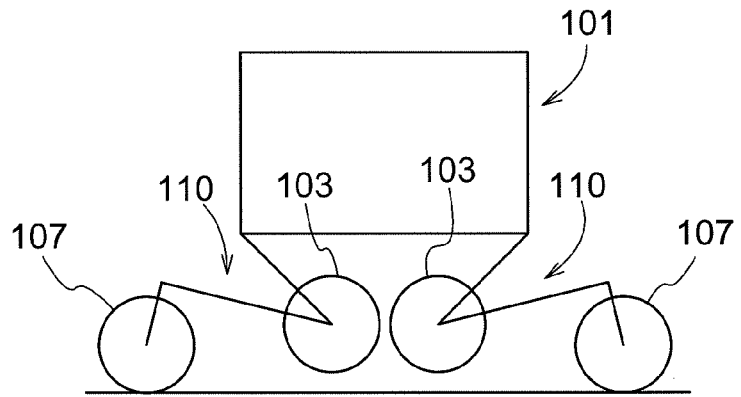
FIG. 19 is an explanatory view of a four-wheel traveling state.
Figure 20:
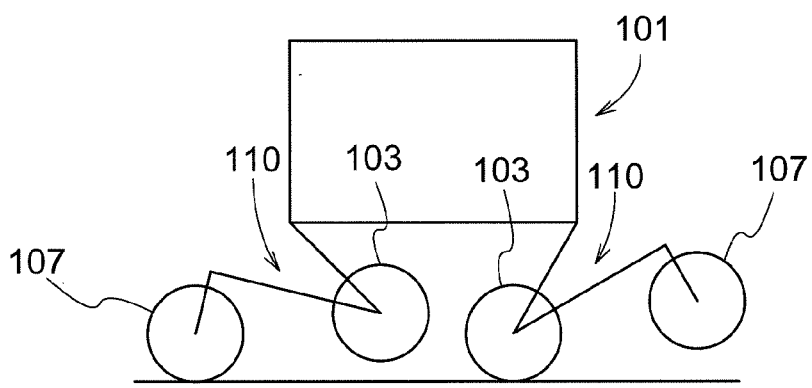
FIG. 20 is an explanatory view of a two-wheel traveling state.
Figure 21:
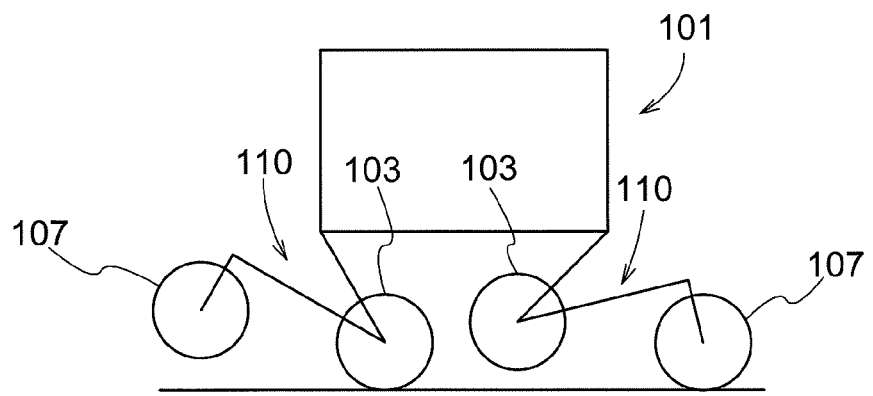
FIG. 21 is an explanatory view of a two-wheel traveling state.

In the case of traveling on a flat ground surface, as shown in FIGS. 19-21, traveling is possible in any one of a plurality of different kinds of traveling modes. Namely, as shown in FIG. 19, a four-wheel traveling mode is possible in which all of the four drive wheels 107 are placed in contact with the ground surface and also all of the four auxiliary wheels 103 are lifted afloat off the ground surface. Alternatively, as shown in FIG. 20, a two-wheel traveling mode is possible in which the drive wheels 107 disposed on one vehicle body front/rear direction side are set afloat and the auxiliary wheels 103 corresponding to these drive wheels 107 are placed in contact with the ground surface, whereas the drive wheels 107 disposed on the other vehicle body front/rear direction side are placed in contact with the ground surface and the auxiliary wheels 103 corresponding thereto are set afloat.

In a still alternatively possible state of the two wheel driving mode, the relation between the drive wheels 107 and the auxiliary wheels 103 is vice versa in the vehicle body front/rear direction. Namely, as shown in FIG. 21, the drive wheels 107 disposed on vehicle body front/rear one side are placed in contact with the ground surface and the auxiliary wheels 103 corresponding to these drive wheels 107 are lifted afloat the ground surface, whereas the drive wheels 107 disposed on the other vehicle body front/rear side are set afloat and the auxiliary wheels 103 corresponding thereto are placed in contact with the ground surface.

Figure 22:
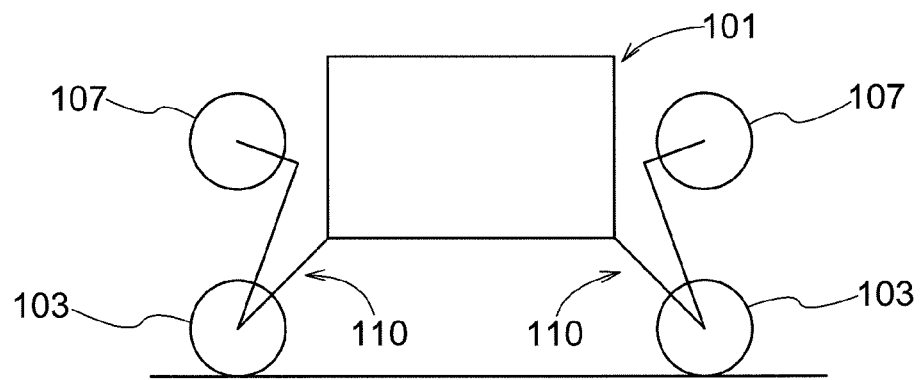
FIG. 22 is a side view of a free movement state.

In addition to the traveling modes described above, as shown in FIG. 22, it is also possible to be switched to an all-free traveling state in which all of the four sets of drive wheels 107 are lifted afloat the ground surface to provide the free movement state. In this case, traveling drive is not possible, but the vehicle can be easily moved manually.

With this work vehicle, in addition to the traveling modes on a flat ground surface described above, as unique additional uses thereof, the vehicle may be used in further modes as follow.

<Two-Leg Erect Mode>

By tilting the vehicle body 101 largely, the drive wheels 107 can be placed on a high place.

Figure 23:
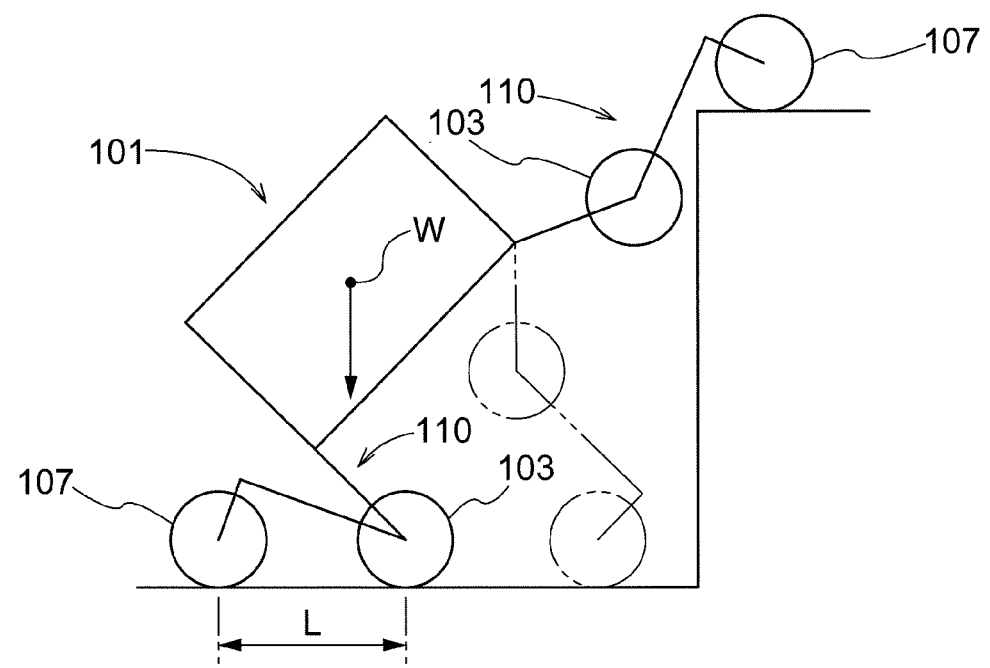
FIG. 23 is a side of a step riding over state.

Namely, as shown in FIG. 23, while two sets of drive wheels 107 and auxiliary wheels 103 on vehicle body front/rear one side are all placed in contact with the ground surface, the vehicle body 101 will be tilted largely so that the body 101 may be elevated on the other side, with using the bending link mechanisms 110 supporting the two sets of drive wheels 107 and the auxiliary wheels 103 on the other side in the vehicle body front/rear direction. And, when the vehicle body 101 has been tilted until a gravity center position W of the vehicle body 101 comes to a position located within a ground contacting width L between the two sets of the drive wheels 107 and auxiliary wheels 103 on the one side, and then the two sets of bending link mechanisms 110 supporting the two sets on the other side can be extended largely, whereby the drive wheels 107 can be placed on a ground surface at a high position.

Figure 24:
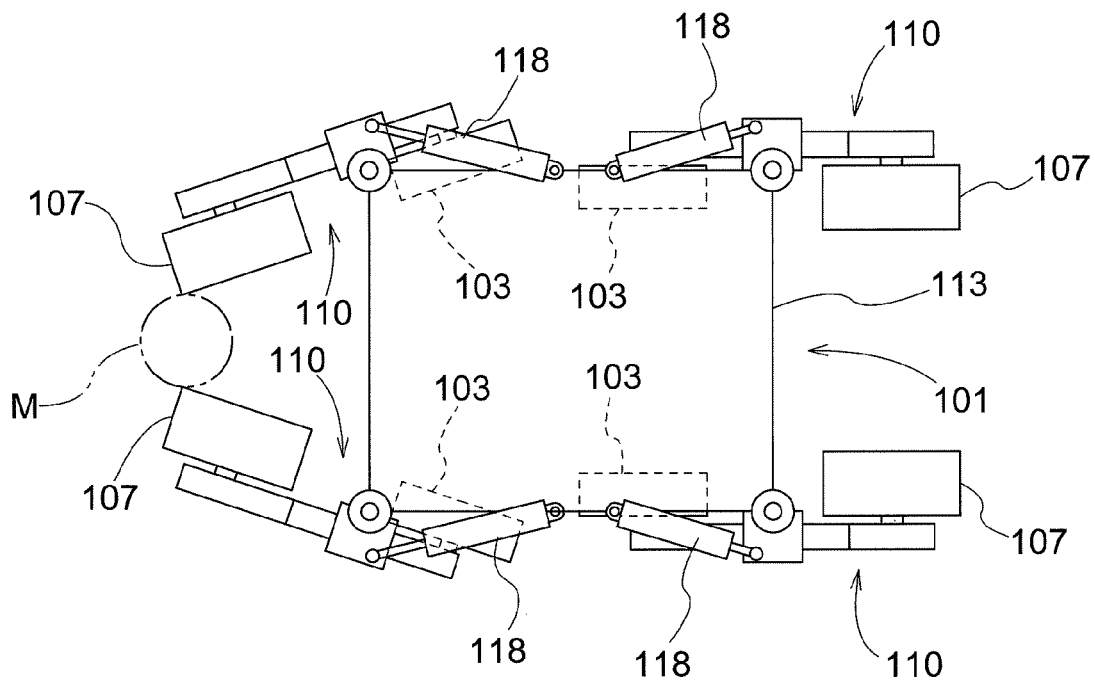
FIG. 24 is a plan view of an article transporting state.
Figure 25:
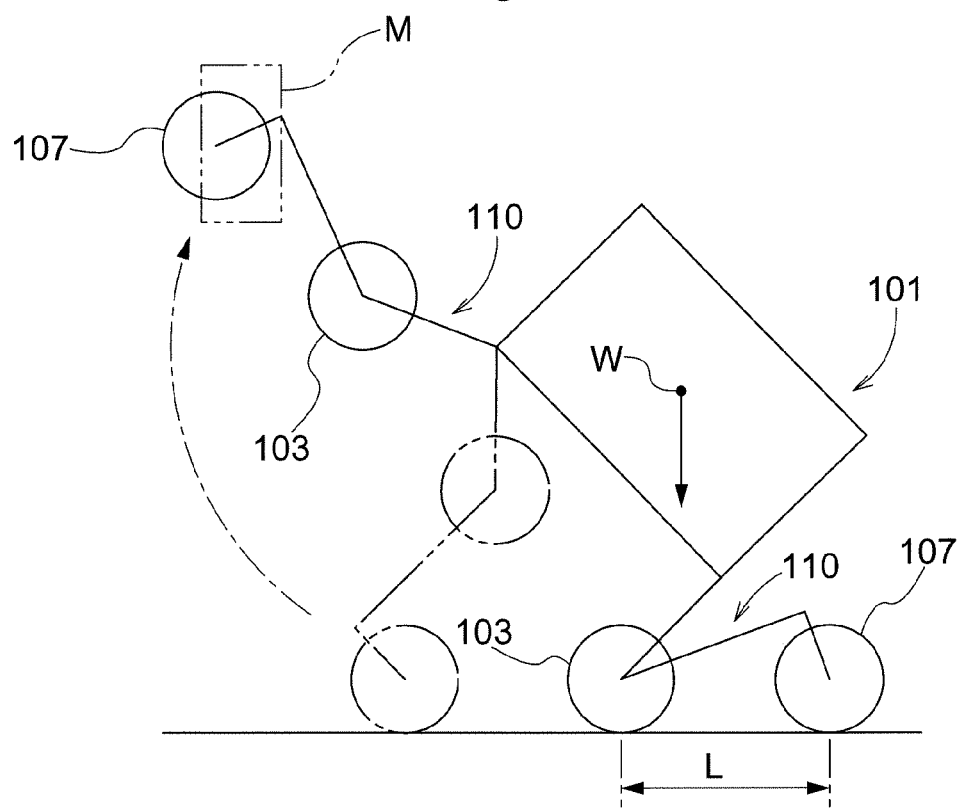
FIG. 25 is a side view of the article transporting state.

In this two leg erect mode, in addition to the mode of riding onto a high place, as shown in FIG. 24 and FIG. 25, an operation of lifting up another object is also possible. Namely, as described above, the vehicle body 101 will be tilted largely with keeping two sets of drive wheels 107 and auxiliary wheels 103 on one side in the vehicle body front/rear direction being placed in contact with the ground surface, until the gravity center position W of the vehicle body 101 comes to the position within the ground contact width L of the two sets of drive wheels 107 and the auxiliary wheels 103 on one side. Further, a turning operation will be made so that the two sets of drive wheels 107 on the other side in the vehicle body front/rear direction come closer to each other. And, an object M as an object to be transported will be clamped and lifted up by the two sets of drive wheels 107 on the other side in the vehicle body front/rear direction. Under the state of the object M being held, traveling can be made with maintaining the posture of the vehicle body 101 by the two sets of drive wheels 107 and the auxiliary wheels 103 on one side in the vehicle body front/rear direction, whereby the object M may be transported.

<Slope Traveling Mode>

Figure 26:
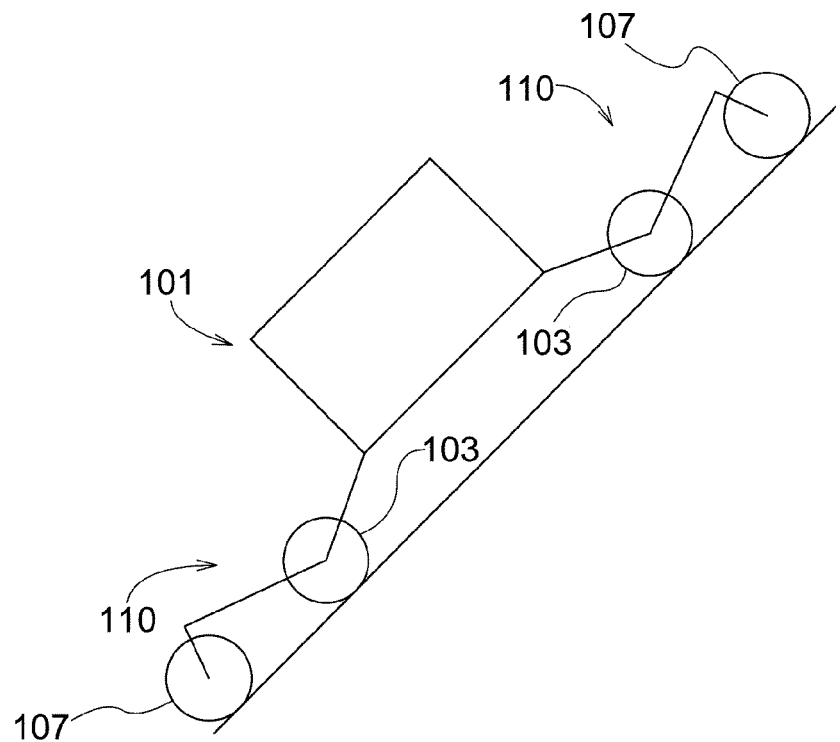
FIG. 26 is a side view of a slope traveling state.

As shown in FIG. 26, for all of the four sets of drive wheels 107 and auxiliary wheels 103, the posture of the bending link mechanism 110 will be changed to an extended posture in which the drive wheel 107 and the auxiliary wheel 103 respectively are located on more outer side in the vehicle body front/rear direction than the vehicle body front/rear outer end. With keeping the drive wheels 107 and the auxiliary wheels 103 all in contact with the ground surface, the height of the vehicle body 101 is set to a low position by setting the first links 125 and the second links 126 as close as possible to the horizontal posture. Under this condition, the vehicle travels as climbing a slope. In this traveling mode, the ground contact width along the vehicle body front/rear direction is increased, so that even on a steeply tilted slope, stable traveling is possible without falling.

<Step Riding-Over Mode>

When three sets of drive wheels 107 and auxiliary wheels 103 are all placed on the ground surface for stable support of the vehicle body 101 on the ground surface, the bending link mechanism 110 which supports the other remaining one set of drive wheel 107 and auxiliary wheel 103 will be extended largely to place the drive wheel 107 on a top face of a step, as shown in FIG. 23 for instance. Then, as movement is made with riding each one set of drive wheel 107 onto the top face of the step, it is possible to ride over the step. In FIG. 23, there is shown a situation in which the step is steep. If the step is of a low profile, then, the vehicle body 101 can ride over it.

<Stride-Over Traveling Mode>

Figure 27:
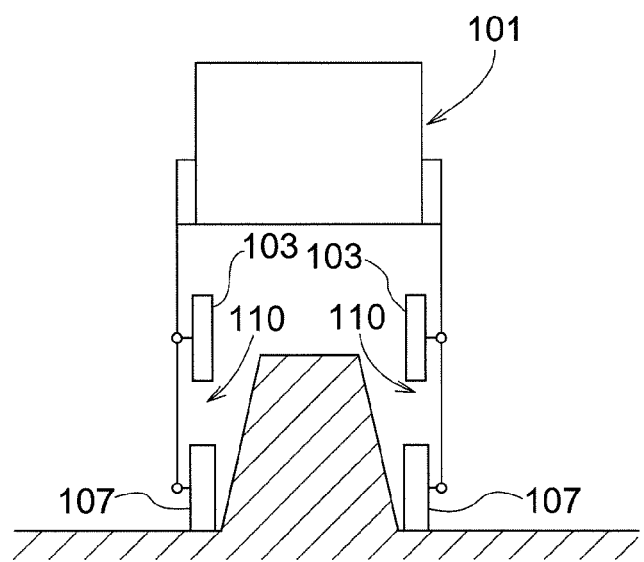
FIG. 27 is a front view of a stride-over traveling state.

As shown in FIG. 27, by largely extending the four sets of bending link mechanisms 110, the vehicle body 101 is largely elevated off the ground surface. With this, for instance, a work is possible with keeping the vehicle body upwards as striding over a ridge. Even when an agricultural produce planted on the ridge has grown, such operations as chemical spraying, harvesting, etc. are possible from above the produce.

Incidentally, though not described in details therein, in the case of traveling in the various modes described above, the control device 115 will control the operations of the respective hydraulic cylinders (the turning cylinder 118, the first hydraulic cylinder 119 and the second hydraulic cylinder 130) and the respective hydraulic motors 109, so that a mode corresponding to contents instructed may be set, based on control information inputted via a manual operation or preset and stored control information.

Third Embodiment

Next, a third embodiment will be described.

In this embodiment, the support arrangement of the drive wheel 107 by the vehicle supporting portion (the bending link mechanism 110) differs, but the rest of the arrangement is identical to the second embodiment. Thus, in the following, the differences from the second embodiment will be described and description of the same arrangements as those of the second embodiment will be omitted.

In this embodiment, each one of the plurality of drive wheels 107 is supported to the pivotal end portion as the other end portion of the second link 126 in the bending link mechanism 110 to be changeable in its orientation about the vertical axis Y2. Further, in this embodiment, the plurality of drive wheels 107 are supported to be located on the outer side in the right/left vehicle body direction relative to the vehicle body supporting portions (bending link mechanisms 110). However, the arrangement is not limited thereto. Conversely, the plurality of drive wheels 107 may be supported to be located on the inner side in the right/left vehicle body direction relative to the vehicle body supporting portions (bending link mechanisms 110) or may be configured to be switchable between the vehicle body outer side and the vehicle body inner side.

Figure 28:
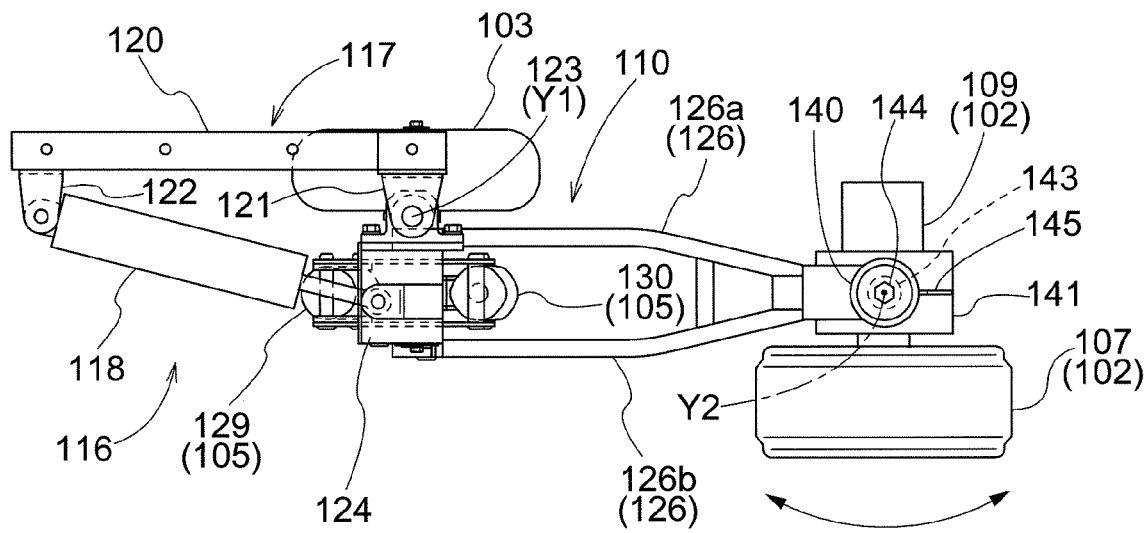
FIG. 28 is a view showing a third embodiment (applied also to the drawings up to FIG. 31) and a plan view of a bending link mechanism.
Figure 29:
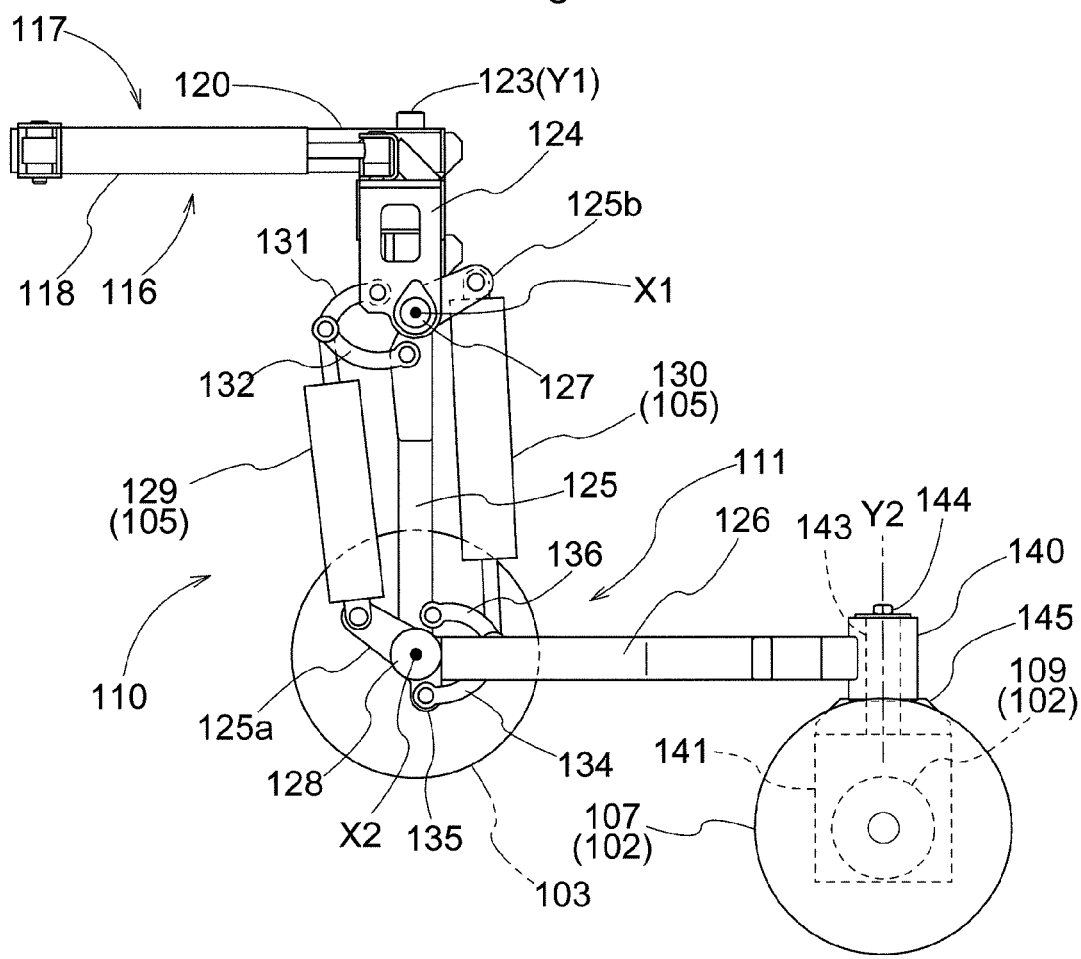
FIG. 29 is a side view of the bending link mechanism.

More particularly, as shown in FIG. 28 and FIG. 29, at the pivotal end portion of the second link 126, there is provided a bearing boss 140 assuming a vertical posture. And, via this bearing boss 140, a wheel base 141 is supported to be pivotable about the vertical axis Y2. The drive wheel 107 is supported to be rotatable about the horizontal axis to be located on the vehicle body outer side in the right/left direction of the wheel base 141. Whereas, the hydraulic motor 109 is supported to be located on the vehicle body inner side in the right/left direction of the wheel base 141. The wheel base 141 integrally includes a support shaft 143 which extends upwards and this support shaft 143 is rotatably supported in/through the bearing boss 140 and is fixedly supported to the bearing boss 140 as being fastened by a screw 144 from above.

Figure 30:
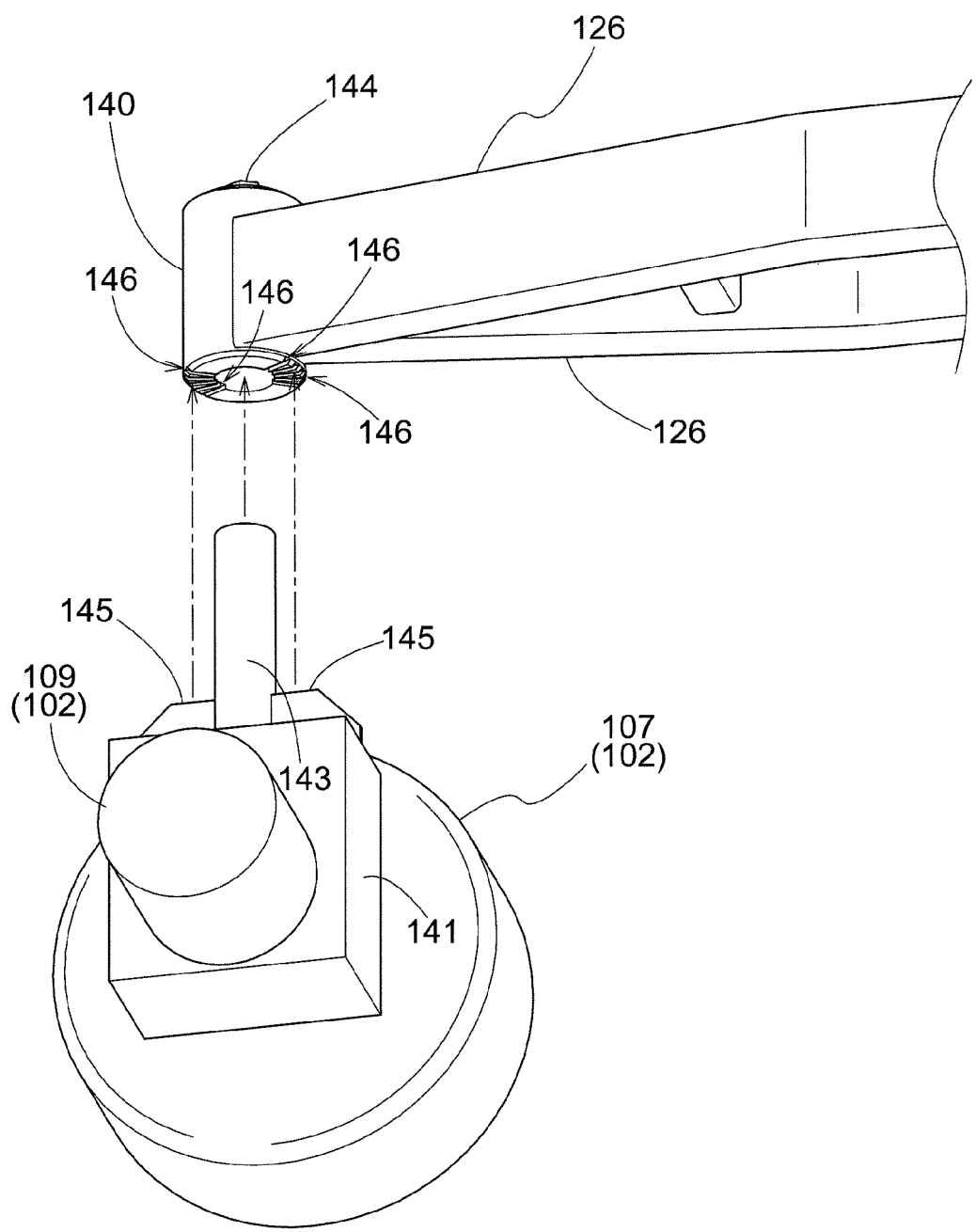
FIG. 30 is an exploded perspective view of a drive wheel supporting portion.

As shown in FIG. 30, on the radially outer sides of the support shaft 143 on the upper side of the wheel base 141, there are provided a pair of retaining plates 145 oriented vertically. On the other hand, at the lower end portion of the bearing boss 140, there are defined recessed grooves 146 in which the retaining plates 145 can enter to be engaged therein. The recessed grooves 146 are formed in plurality at positions different in the circumferential direction of the support shaft 143. With selectively engaging the retaining plates 145 in different recessed grooves 146 with releasing of screw fastening, the orientation of the drive wheel 107 about the vertical axis Y2 relative to the second link 126 can be changed.

With this arrangement, by changing the orientations of the respective bending mechanisms 110 disposed in opposition to each other in the vehicle body right/left direction by the turning mechanisms 116 to mutually different directions, the spacing between the drive wheels 107 of these two bending link mechanisms 110 can be variably set and also by changing the orientations of the two drive wheels 107 about the vertical axis Y2, the rotational directions of the two drive wheels 107 can be set parallel with each other.

Figure 31:
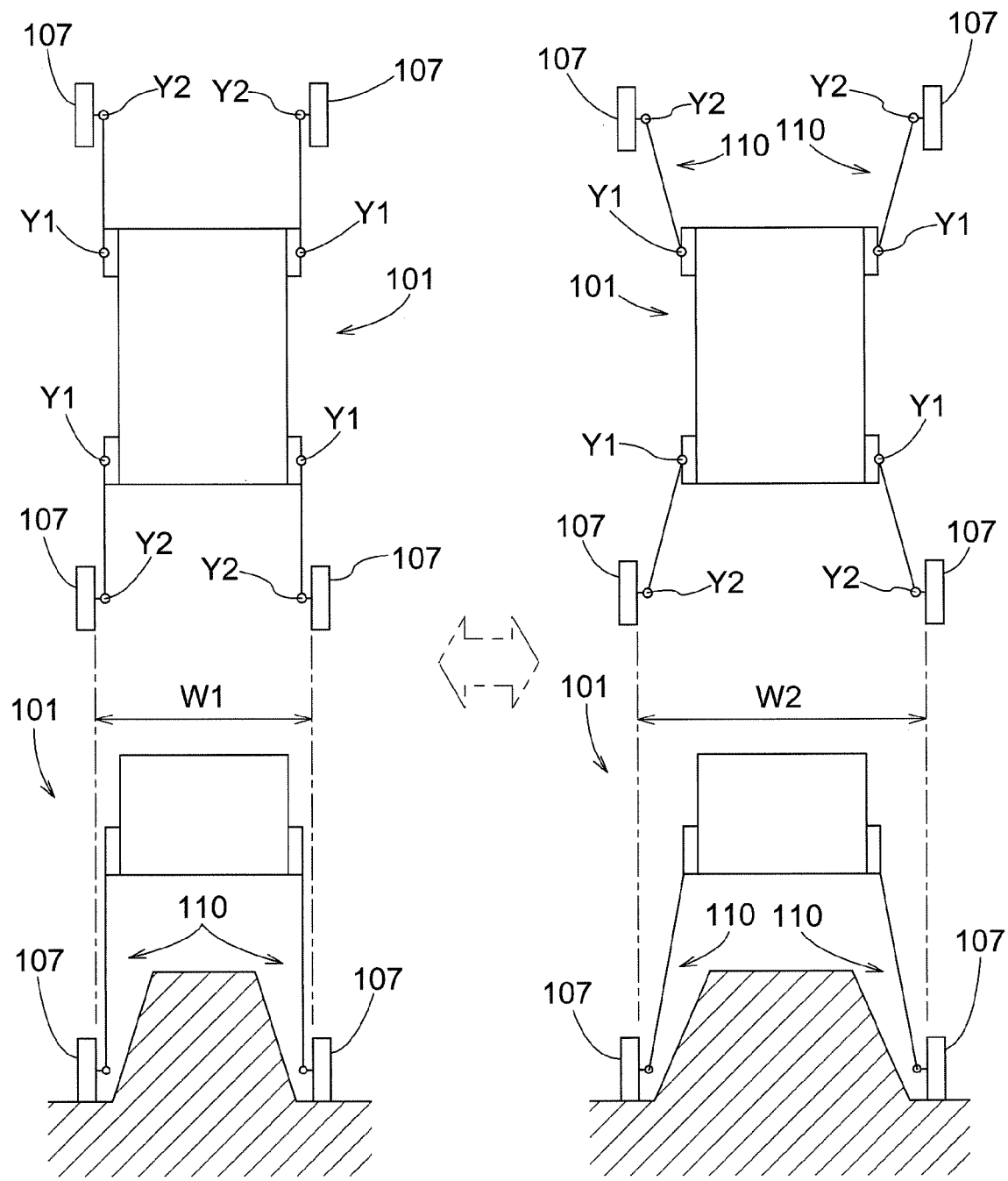
FIG. 31 is a plan view showing a condition in which an inter-wheel spacing has been changed.

More particularly, with using the turning cylinder 118, the bending link mechanism 110 is pivoted about the vertical axis Y1, so that, as shown in FIG. 31, the ending link mechanism 110 is pivoted toward the laterally outer side. Next, by a manual operation, the wheel base 141 is pivoted about the vertical axis Y2, whereby the drive wheel 107 may be set to a posture along the front/rear direction (straight traveling state). In this, if the right and left bending link mechanisms 110 are pivoted to the outer sides in the right/left direction relative to each other about the vertical axis Y1, the spacing between the right and left drive wheels 107 is increased. Conversely, if they are pivoted to the inner sides in the right/left direction, the spacing between the right and left drive wheels 107 is decreased. Whereby, as shown in FIG. 31, the right/left spacing (tread width) between the drive wheels 107 in the case of straight traveling of the work vehicle can be changed to various widths within a predetermined range, so that the bank lateral widths W1, W2 can cope with various kinds of work modes.

As alternative arrangements of this third embodiment, following arrangements may be employed.

In place of the arrangement of changing the orientation of the drive wheel 107 about the vertical axis Y2 manually, the orientation can be changed to be fixed with use of an actuator such as a hydraulic motor, an electric motor, etc.

The drive wheel 107 may be arranged to be supported to be positioned on the vehicle body inner side in the right/left direction relative to the vehicle body supporting portion (bending link mechanism 110).

As a turning mechanism, in place of the turning cylinder, a rod may be provided to be supported between the inner side pivot bracket 122 and the base end portion 124; and by replacing this rod with any one of rods having various lengths, the vehicle body supporting portion (bending link mechanism 110) may be turned. In this case, a steering operation may be effected by changing the orientation of the drive wheel 107 about the vertical axis Y2.

The wheel base 141 may be configured to be adjustably pivotable about a horizontally oriented axis relative to the vehicle body supporting portion (bending link mechanism 110), thus allowing change in the relative front/rear position of the drive wheel.

Modified Embodiments of Second and Third Embodiments (1) In the foregoing embodiment, for changing the posture of the bending link mechanism 110, the first hydraulic cylinder 129 and the second hydraulic cylinder 130 are provided as the driving operational portion. In place of this arrangement, a hydraulic motor may be provided at the pivotal portion of the bending link mechanism 110 so that the posture of the bending link mechanism 110 may be changed by this hydraulic motor.

(2) In the foregoing embodiment, the bending link mechanism 110 is provided as the "vehicle body supporting portion". In place of this arrangement, as the vehicle body supporting portion, it is possible to employ e.g. a robot arm or the like which can be freely bent in a desired direction for supporting the drive wheel 107. In short, any arrangement may suffice as long as it supports each one of the drive wheels 107 to the vehicle body 101 independently of the remaining drive wheel 107, with allowing change of the height position of the former relative to the latter and that supports the vehicle body with the ability of maintaining its posture. Specific arrangement may be modified in various ways for embodiment.

(3) In the foregoing embodiment, the first hydraulic cylinder 129 has its cylinder tube side pivotally coupled to the coupled portion (base end portion 124) on the vehicle body side and has its piston rod side pivotally coupled to the coupled portion (arm portion 135) on the first link side. In place of this arrangement, the first hydraulic cylinder 129 may have its cylinder tube side pivotally coupled to the coupled portion (arm portion 135) on the first link side and have its piston rod side pivotally coupled to the coupled portion (base end portion 124) on the vehicle body side.

(4) In the foregoing embodiment, the drive wheel 107 is driven by the hydraulic motor 109. In place of this arrangement, it is also possible to arrange e.g. such that power of an engine mounted on the vehicle is supplied to the drive wheel 107 via a mechanical power transmission mechanism such as a chain transmission mechanism.

(5) In the foregoing embodiment, as the turning operating device, there is provided a turning hydraulic cylinder (turning cylinder 118) which is capable of turning the bending link mechanism 110 as a whole. Instead, the turning operation may be effected by an electric motor or a hydraulic motor.

(6) In the foregoing embodiment, a four-leg, four-wheel robot of hydraulic electronic control type was used as an example of "work vehicle". However, the present invention is not limited to the configuration shown in the drawings.

Fourth Embodiment

Figure 32:
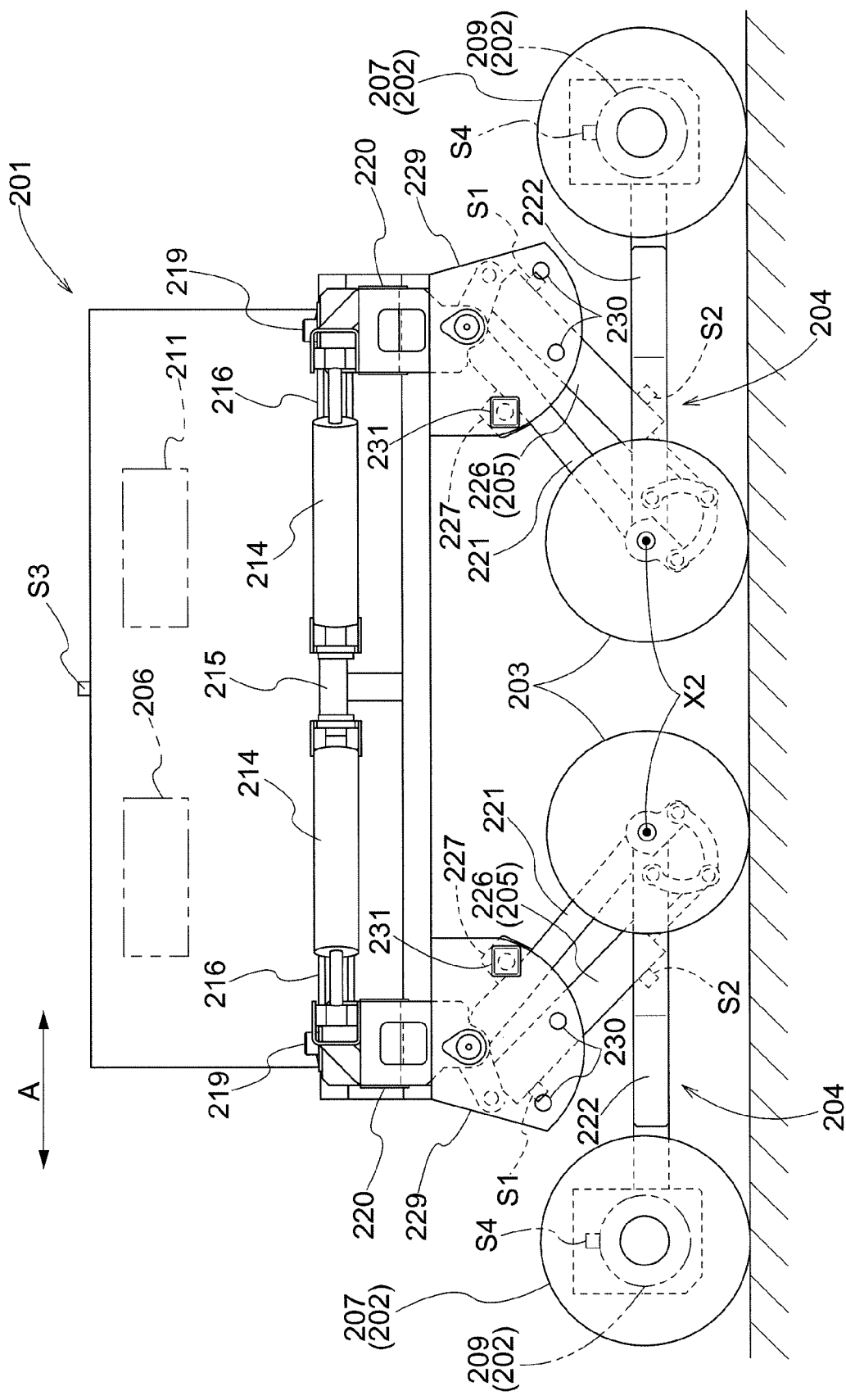
FIG. 32 is a view showing a fourth embodiment (applied also to the drawings up to FIG. 46) and an overall side view of a work vehicle.
Figure 33:
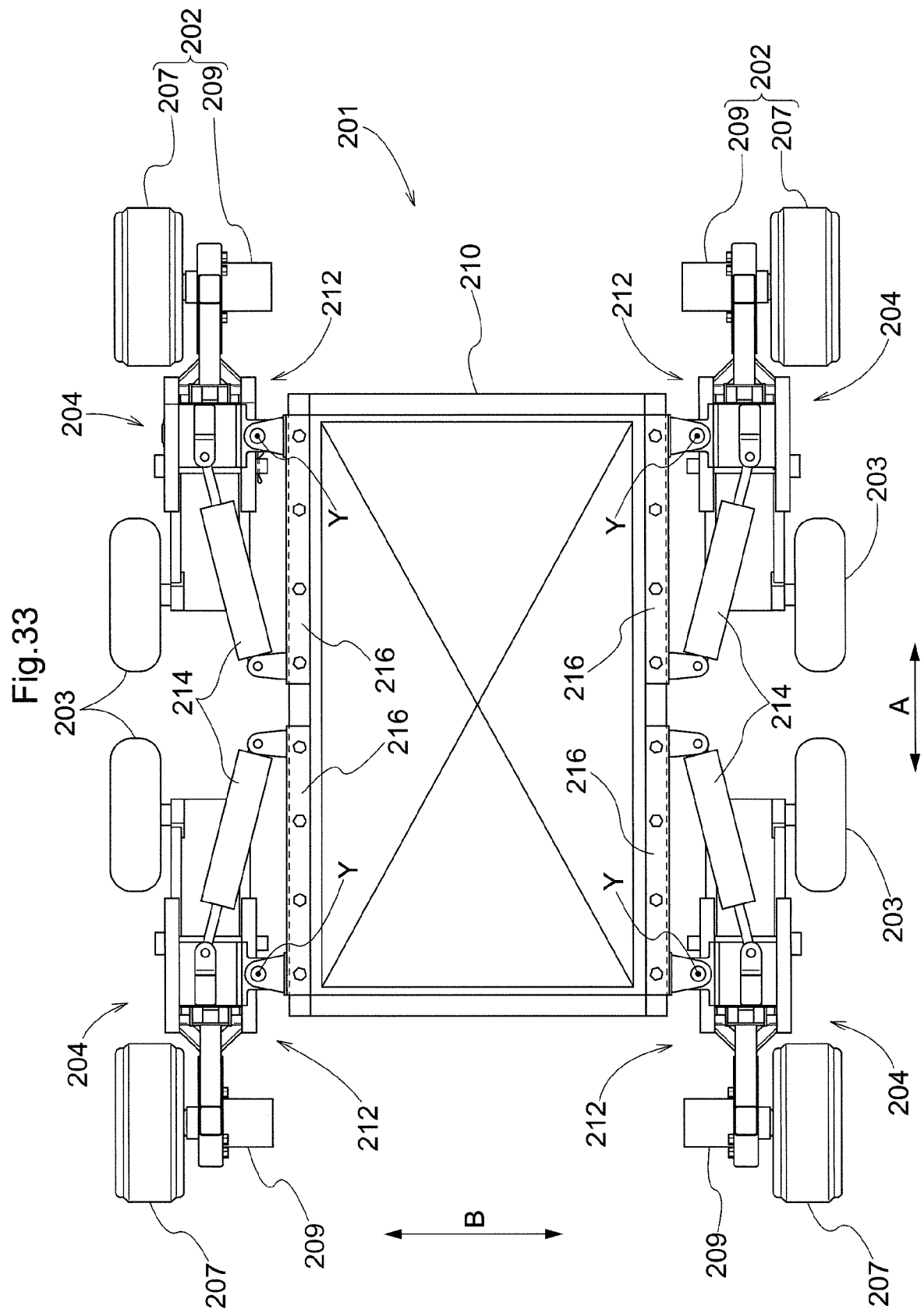
FIG. 33 is an overall plan view of the work vehicle.

As shown in FIGS. 32 and 33, a work vehicle includes a vehicle body 201 in the form of an approximately rectangular frame for supporting the entire vehicle, a plurality of (specifically four) hydraulically driven traveling devices 202, a plurality of auxiliary wheels 203 provided in correspondence with the plurality of traveling devices 202 respectively, a plurality of bending link mechanisms 204 as a plurality of articulated link mechanisms for supporting the plurality of traveling devices 202 to the vehicle body 201 with allowing changes of positions thereof, hydraulic operation type drive operating device 205 capable of variably operating the bending link mechanisms 204, and a work oil feeding device 206 as a hydraulic source for feeding work oil. The drive operating device 205 comprise hydraulic cylinders 226.

Each one of the four traveling devices 202 includes a drive wheel 207 supported to be rotatable about a horizontal axis and a hydraulic motor 209 provided in a bearing portion of the drive wheel 207. Each traveling device 202, with activation of the hydraulic motor 209, can rotatably drive the drive wheel 207 respectively.

In this embodiment, when definitions are to be made for the front and rear sides of the vehicle body, these definitions are made along the vehicle body advancing direction. When definitions are to be made in the right/left direction of the vehicle body, these definitions are made as seen in the vehicle body advancing direction. Namely, the direction denoted with a sign (A) in FIG. 32 represents the vehicle body front/rear direction and the direction denoted with a sign (B) in FIG. 33 represents the vehicle body right/left direction.

The vehicle body 201 includes a support frame 210 in the form of a rectangular frame that surrounds the entire circumference of the vehicle body 201 and that also supports the vehicle body entirely. The work oil feeding device 206 is accommodated and supported inside the vehicle body 201. Though not described in detail herein, the work oil feeding device 206 includes a hydraulic pump driven by an engine mounted on the vehicle and feeding work oil, a hydraulic control unit for controlling feeding/discharging of work oil to/from the plurality of hydraulic cylinders 226 and the plurality of hydraulic motors 209 as well as flow rate adjustment of the work oil, and a work oil tank for reserving an amount of work oil therein.

Inside the vehicle body 201, there is mounted a control device 211 for controlling operations of the work oil feeding device 206.

Control operations by the control device 211 will not be detailed herein. Briefly, based on instruction information inputted via a manual input device (e.g. a remote controller, etc.) or preset and prestored instruction information, the operations of the hydraulic control unit are controlled.

Next, a support arrangement for supporting the traveling devices 202 to the vehicle body 201 will be described.

Each one of the four traveling devices 202 is supported to the vehicle body 201 via the bending link mechanism 204 to be liftable up/down respectively. And, the bending link mechanism 204 is supported to the vehicle body 201 with its orientation being changeable about a vertical axis by a turning mechanism 212.

As shown in FIG. 33, the bending link mechanism 204 is supported to a support frame 210 to be pivotable about a vertical axis Y via the turning mechanism 212. The turning mechanism 212 includes a vehicle body side supporting portion 213 (see FIG. 34 and FIG. 35) which is coupled to the support frame 210 and also pivotally supports the bending link mechanism 204, and a turning hydraulic cylinder (to be referred to as "turning cylinder 214" hereinafter) for turning the bending link mechanism 204.

As shown in FIGS. 34-37, the vehicle body side supporting portion 213 includes: a coupling member 216 which engages by sandwiching a pair of upper and lower front/rear oriented frame bodies 215 in the form of angular cylinders provided at lateral portions of the support frame 210 to be removably bolt-connected thereto; an outer side pivot bracket 217 disposed at an outer side portion in the vehicle body front/rear direction of the coupling member 216; an inner side pivot bracket 218 disposed at an inner side portion in the vehicle body front/rear direction of the coupling member 216; and a vertically oriented pivot shaft 219 supported to the outer side pivot bracket 217, whereby the vehicle body side supporting portion 213 supports the bending link mechanism 204 with allowing pivotal movements thereof about the vertical axis Y of the pivot shaft 219.

The bending link mechanism 204 includes: a base end portion 220 which has its position in the vertical direction fixed and which is supported to the vehicle body side supporting portion 213 to be pivotable about the vertical axis Y; a first link 221 having one end portion thereof supported to a lower portion of the base end portion 220 to be pivotable about a horizontal axis X1; and a second link 222 having one end portion thereof supported to the other end portion of the first link 221 to be pivotable about a horizontal axis X2 and having the other end portion thereof supported to the traveling device 202. Namely, of the two links 221, 222 included in the bending link mechanism 204, the first link 221 disposed closer to the vehicle body 201 is supported to be pivotable about the body side coupling portion (lower portion of the base end portion 220), and the second link 222 is supported to be pivotable about the coupling portion to the first link 221.

More particularly, the base end portion 220 is provided in the form of a rectangular frame as seen in a plan view and is supported to the outer side pivot bracket 277 of the vehicle body side supporting portion 213 to be pivotable about the vertical axis Y via the pivot shaft 219. The turning cylinder 214 has one end portion thereof pivotally coupled to the inner side pivot bracket 218, and has the other end portion thereof pivotally coupled to a portion of the base end portion 220 at a position laterally displaced relative to the pivot shaft 219.

Figure 35:
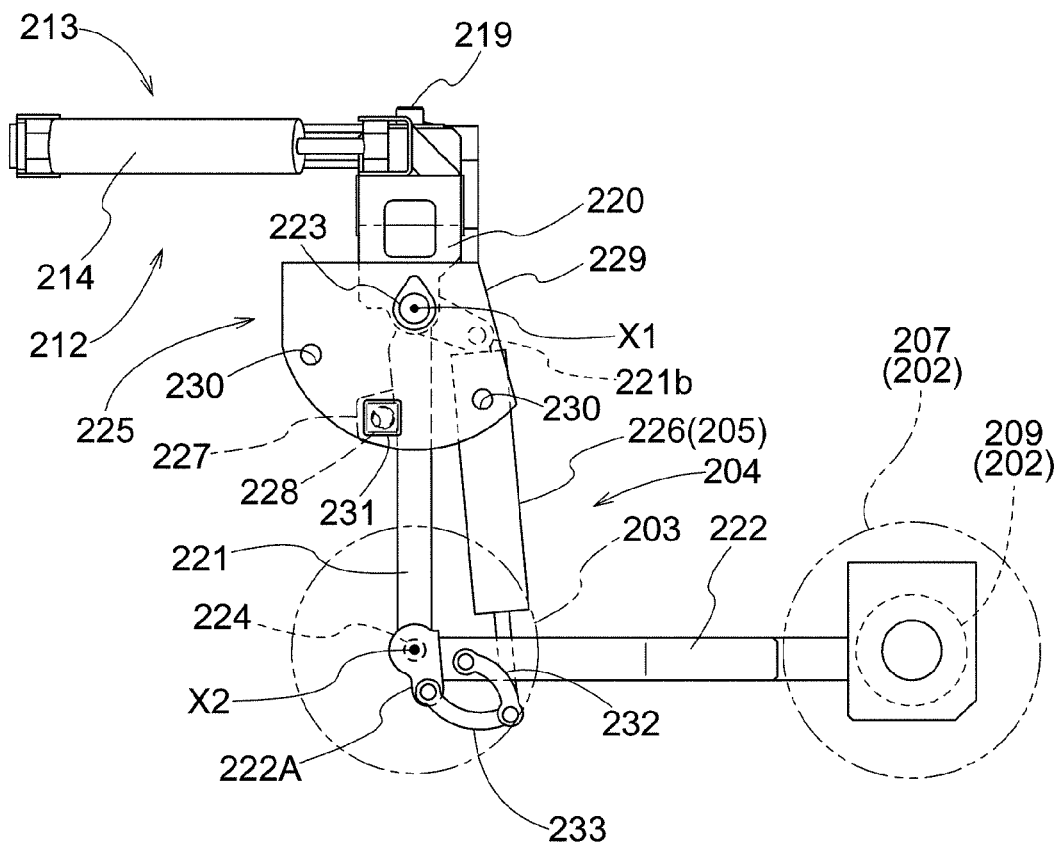
FIG. 35 is a side view of the bending link mechanism.
Figure 36:
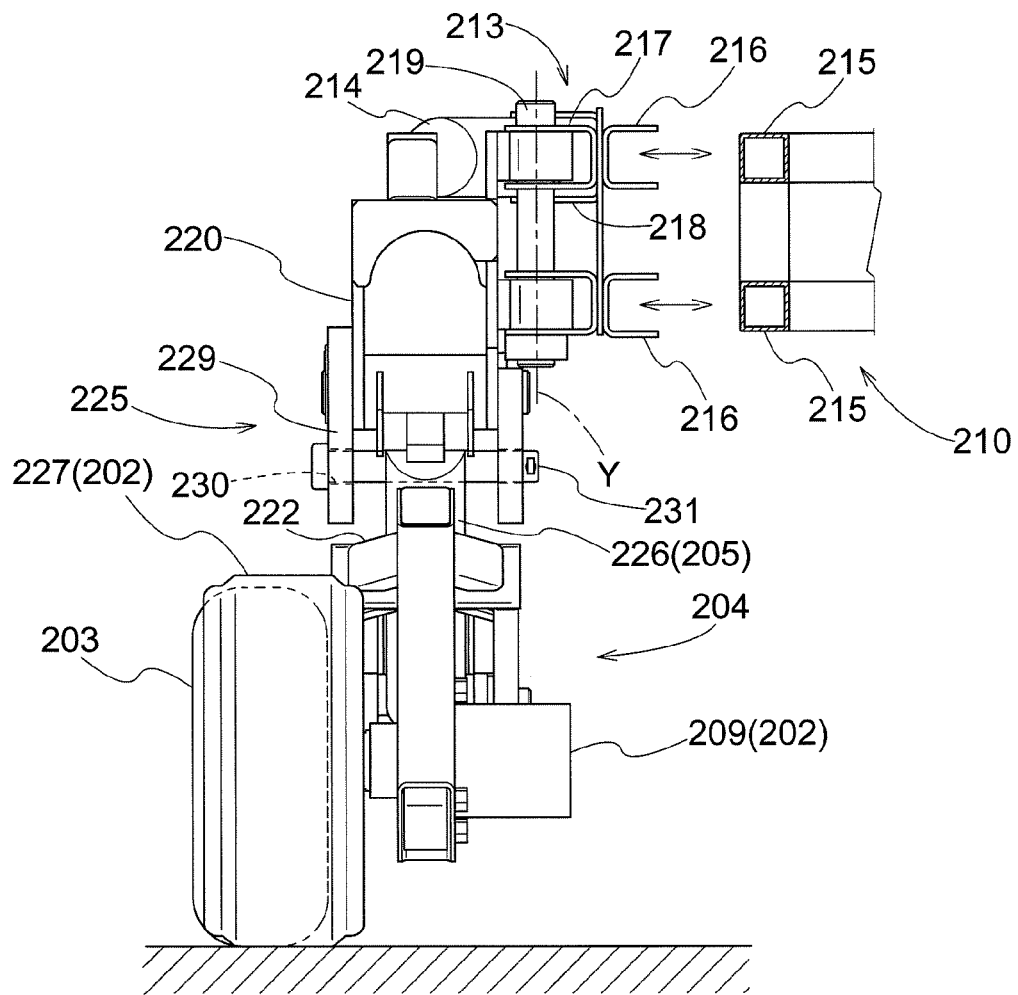
FIG. 36 is a front view showing an attachment state of the bending link mechanism under a removed state.
Figure 37:
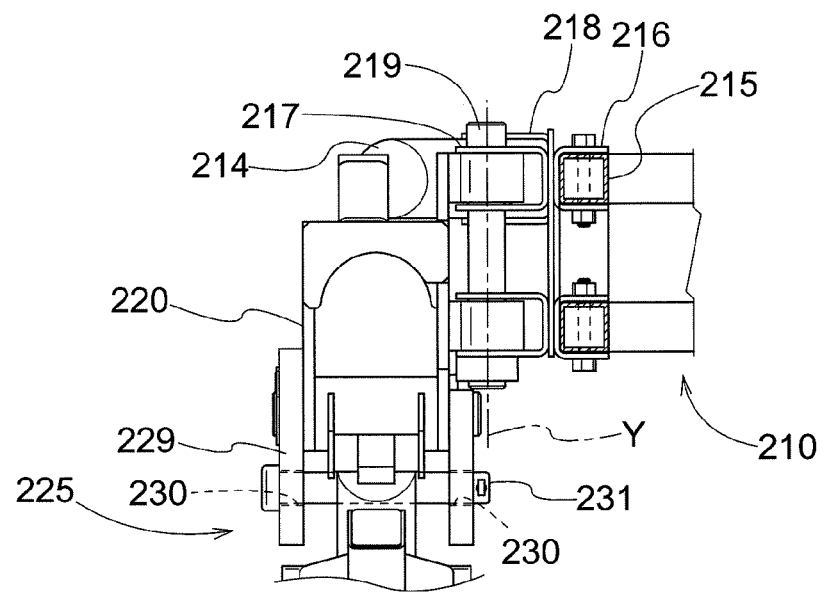
FIG. 37 is a front view showing an attachment state of the bending link mechanism under an attached state.

Between and across right and left opposed sides of the base end portion 220, a support shaft 223 provided at one end of the first link 221 is pivotally supported and the first link 221 is coupled to the lower portion of the base end portion 220 to be pivotable about the axis of the support shaft 223. As shown in FIG. 35, at the base end side portion of the first link 221, there is formed a base end side arm portion 221b integrally therewith which portion 221b extends obliquely upwardly outward when the first link 221 assumes a vertically oriented posture.

Figure 34:
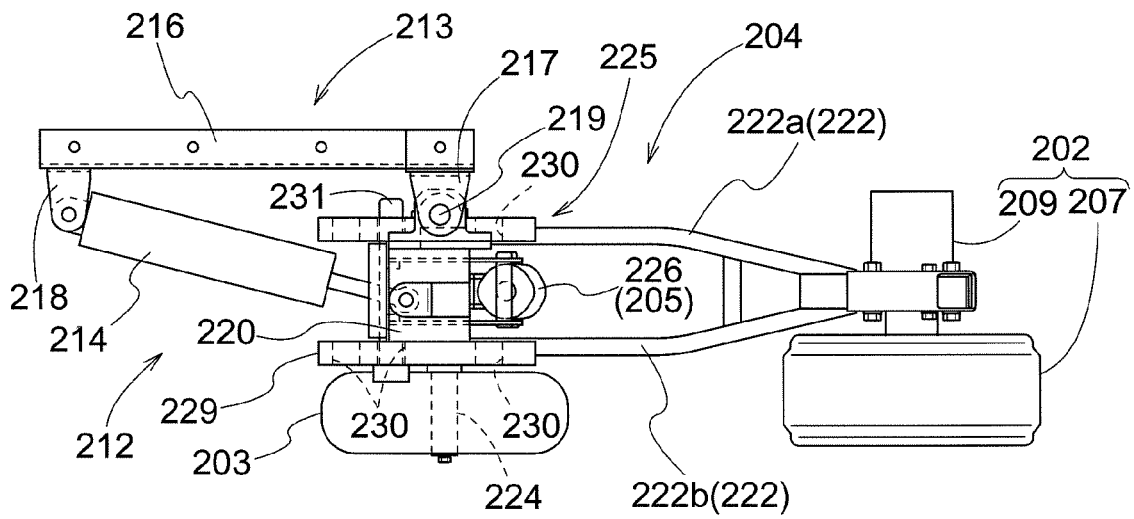
FIG. 34 is a plan view of a bending link mechanism.

As shown in FIG. 34, the second link 222 is formed bifurcated with a pair of right and left band-plate like plate bodies 222a, 222b, as seen in a plan view. The pair of plate bodies 222a, 222b keep the spacing distance from each other at a position of the second link 222 connected to the first link 221. At the area sandwiched by the pair of plate bodies 222a, 222b, a coupling pivot shaft 224 to be coupled with the first link 221 is pivotally supported. At the pivotal side end portion opposite to the coupling portion of the second link 222 relative to the first link 221, the traveling device 202 is supported.

Each one of the four bending link mechanisms 204 includes a pivotal position adjusting portion 225 (an example of manually operable position fixing device) capable of fixing the first link 221 selectively at one of a plurality preset pivot switching positions, and a hydraulic cylinder 226 as a driving operating device 205 capable of changing pivotal posture of the second link 222 relative to the first link 221. The hydraulic cylinder 226 is disposed in the vicinity of the first link 221 and arranged side by side therewith. As seen in a plan view, the first link 221 and the hydraulic cylinder 226 are disposed as being located between the pair of plate bodies 222a, 222b of the second link 222.

Next, the pivotal position adjusting portion 225 will be described.

The pivotal position adjusting portion 225 is configured to be capable of fixing the first link 221 in position, to one of a vertically oriented position (see FIG. 41) at which the first link 221 assumes an approximately perpendicular posture, an inward pivotal position (see FIG. 40) at which the first link 221 is pivoted by a set pivotal amount toward the inner side in the vehicle body front/rear direction relative to the vertically oriented position, and an outward pivotal position (see FIG. 42) at which the first link 221 is pivoted by a set pivotal amount toward the outer side in the vehicle body front/rear direction relative to the vertically oriented position. More particularly, the first cylinder 221 integrally forms a retaining functional portion 227; and an insertion hole 228 is formed to extend through the retaining functional portion 227 in the right/left direction.

A restriction member 229 is provided as being overlapped, as seen in the side view, with the position at which the insertion hole 228 of the first link 221 extends through. The restriction member 229 is integrally coupled and fixed to the base end portion 220 of the bending link mechanism 204. In the restriction member 229, there are defined position restriction engagement holes 230 extending therethrough in the right/left direction, at respective positions to which the insertion hole 228 formed in the first link 221 will come into opposition when the first link 221 is switched to any one of the vertically oriented position, the inward pivotal position and the outward pivotal position, respectively. In operation, when the first link 221 has been switched to any one of the vertically oriented position, the inward pivotal position and the outward pivotal position, a retaining rod 231 will be inserted into the engagement hole 230 of the restriction member 229 and the insertion hole 228 of the first link 221, whereby the relative position of the first link 221 relative to the vehicle body 201 can be fixed.

Figure 41:
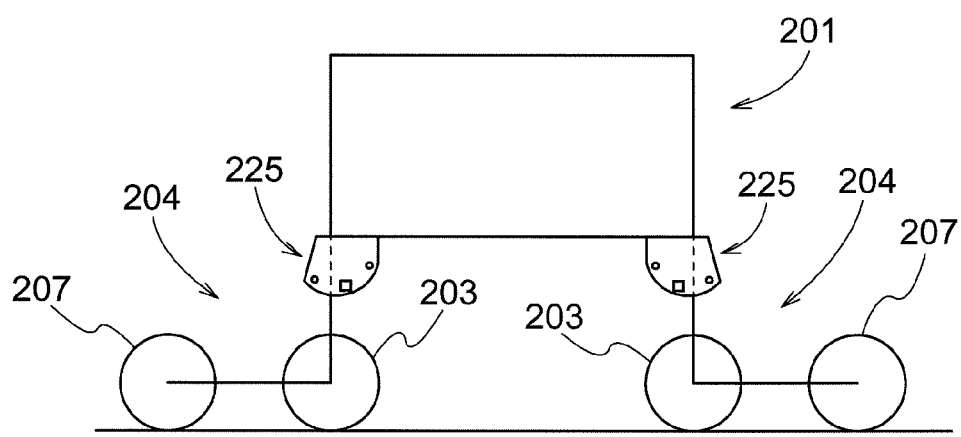
FIG. 41 is an explanatory view showing a state in which the first link is set to an inwardly oriented pivotal position.

In case the work vehicle travels on a flat ground surface such as traveling on a bank, traveling in a field, etc., as shown in FIG. 41, the work traveling will be effected with switching the first link 221 to the vertically oriented position. Under this state, there is less risk of an excessive force in a twisting direction being applied to the pivotal position adjusting portion 225 at the vehicle body side supporting position of the first link 221, and the load of the vehicle body 201 can be received mainly by the hydraulic cylinder 226. As a result, hydraulic control is facilitated and the posture control of the vehicle body 201 can be effected with high precision.

Figure 40:
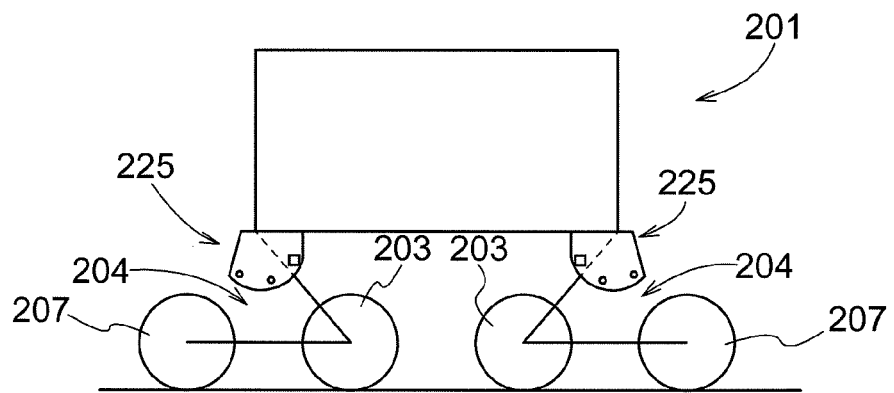
FIG. 40 is an explanatory view showing a state in which a first link is set to a vertically oriented position.

In such case when the work vehicle makes a turn within a relatively small work area or the work vehicle is to be stored at a storage place or the work vehicle is to be transported by a transporter vehicle, as shown in FIG. 40, the first links 221 will be switched to the inward pivotal position. Under this state, the outer dimension of the vehicle body in the front/rear direction may be reduced to provide a compact shape.

Figure 42:
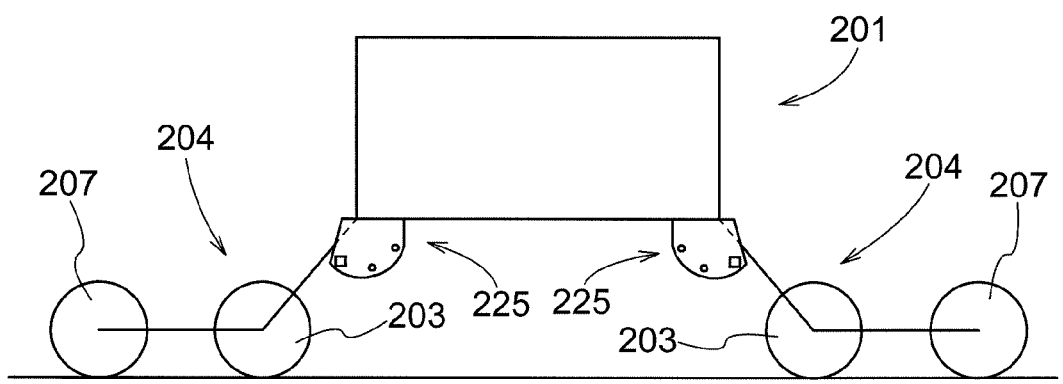
FIG. 42 is an explanatory view showing a state in which the fist link is set to an outwardly oriented pivotal position.

In such case when the work vehicle travels on a slope or travels on a flat and paved road surface at a high speed, etc., as shown in FIG. 42, the work traveling will be effected with switching the first links 221 to the outward pivot position. Under this state, the spacing between the front and rear traveling devices 202 is increased, so that stable traveling under a low gravity state is made possible.

The hydraulic cylinder 226 is disposed on the outer side in the vehicle body front/rear direction relative to the first link 221 to extend substantially along the longitudinal direction of the first link 221. The hydraulic cylinder 226 has its base end side (upper side) end portion interlocked and coupled to the base end side arm portion 221b that is formed integrally with the first link 221 on the base side of the first link 221. The pivotal side (lower side) end portion of the hydraulic cylinder 226 is interlocked and coupled to the arm portion 222A that is formed integrally with the second link 222 at the base end portion of the second link 222. The pivotal side end portion of the hydraulic cylinder 226 is interlocked and coupled also to the pivotal end side portion of the first link 221 via a further second interlocking member 233. The first interlocking member 232 and the second interlocking member 233 have respective opposed ends thereof pivotally coupled to each other to be pivotal relative to each other.

When the hydraulic cylinder 226 is expanded/contracted, with the posture of the first link 221 relative to the vehicle body 201 being maintained constant, the second link 222 and the traveling device 202 are pivoted together about the horizontal axis X2 at the coupling portion between the first link 221 and the second link 222.

At the intermediate bending portion of each one of the four bending link mechanisms 204, the auxiliary wheel 203 is supported to be freely rotatable. As shown in FIGS. 32 and 33, the auxiliary wheel 203 is constituted of a wheel having an approximately equal outside diameter to that of the drive wheel 207. As shown in FIG. 34, the coupling pivot shaft 234 that pivotally couples the first link 221 to the second link 222 is formed to extend to protrude to more outer side in the vehicle body lateral width direction than the second link 222. The auxiliary wheel 203 is rotatably supported to an extended/protruded position of the coupling pivot shaft 224. Namely, the coupling pivot shaft 224 that pivotally couples the first link 221 to the second link 222 is configured to act also as a pivot shaft for the auxiliary wheel 203, thus simplification of arrangement through component co-utilization being sought for.

Figure 38:
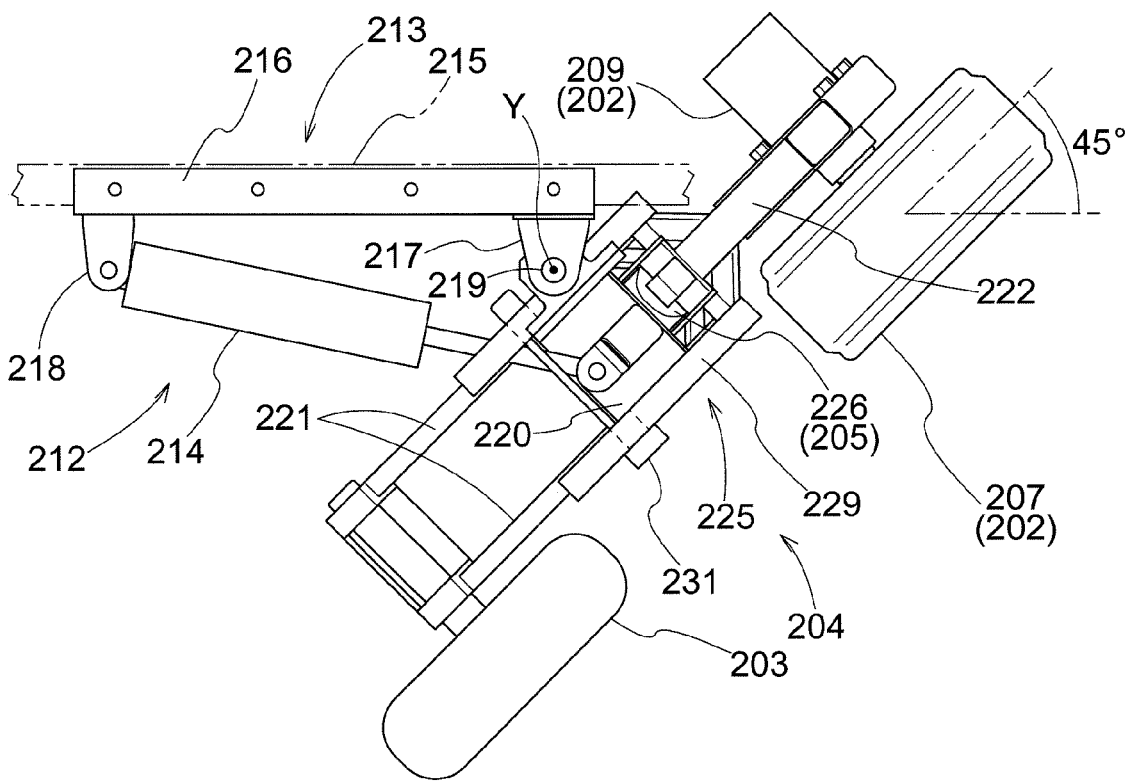
FIG. 38 is a plan view showing a left turning state by a turning mechanism.
Figure 39:
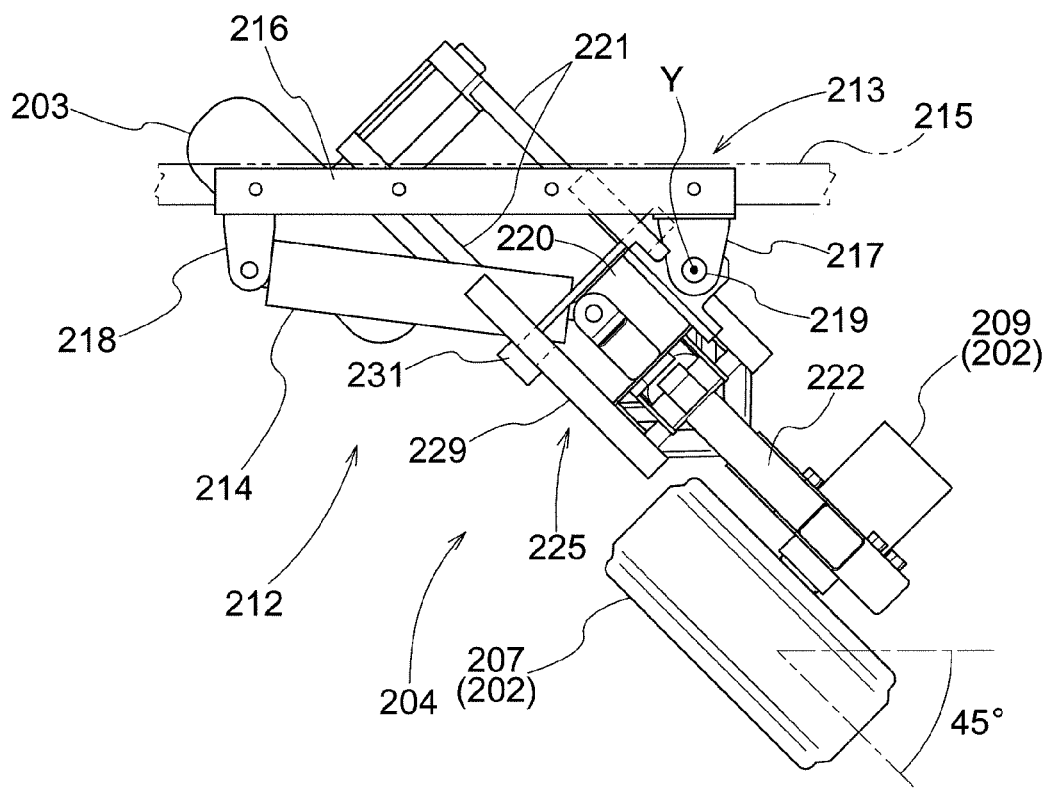
FIG. 39 is a plan view showing a right turning state by the turning mechanism.

As shown in FIGS. 38 and 39, the bending link mechanism 204, the traveling device 202, the auxiliary wheel 203 and the hydraulic cylinder 226 respectively are supported to the outer side pivot bracket 217 to be pivotable together about the vertical axis Y of the pivot support shaft 219. And, these will be pivotally operated together by expanding/contracting the turning cylinder 214. Whereby, turning operation is possible for each increment of about 45 degrees from a straight traveling state, in which the traveling device 202 is oriented in the front/rear direction, to the left turning direction and the right turning direction, respectively.

If bolt coupling of the coupling member 216 to the front/rear oriented frame body 215 is released, it becomes possible to remove the turning mechanism 212, the bending link mechanism 204, the traveling device 202, the auxiliary wheel 203 and the hydraulic cylinder 226, as being assembled to each other, from the vehicle body 201 altogether. Also, by bolt-coupling the coupling member 216 to the front/rear oriented frame body 215, it is possible to attach the above respective devices, as being assembled together, to the vehicle body 201 altogether.

With feeding/discharging of work oil from the work oil feeding device 206 to/from the hydraulic cylinders 226 of the respective one of the plurality of bending link mechanisms 204, the hydraulic cylinders 226 can be expanded/contracted. And, with execution of flow rate adjustment of the work oil relative to the hydraulic motor 209, the rotational speed of the hydraulic motor 209, namely, of the drive wheel 207 can be changed.

As shown in FIG. 32, this work vehicle includes various sensors. Specifically, the hydraulic cylinder 226 includes a first head side pressure sensor S1 and a second cap side (remote-from-head side) pressure sensor S2. The first head side pressure sensor S1 detects an oil pressure of the head side chamber of the hydraulic cylinder 226. The first cap side pressure sensor S2 detects an oil pressure of the cap side chamber of the hydraulic cylinder 226. Further, though not shown, each of the hydraulic cylinder 226 and the turning hydraulic sensor (turning cylinder 214) for turning operation incorporates a stroke sensor that is capable of detecting an expansion/contraction stroke amount and that is configured to feedback its operational state to the control device 221.

Incidentally, it is noted that the attachment positions of the respective pressure sensors S1, S2 are not limited to those described above. The respective pressure sensors S1, S2 need only to be capable of detecting (estimating) the oil pressure of the cap side chamber or the head side chamber corresponding thereto, thus may be disposed in a pipe extending from the valve mechanism to the cap side chamber or the head side chamber corresponding thereto.

Based on detection results from these sensors, a force needed for supporting the vehicle body 201 is calculated and based on this result, feeding of work oil to the hydraulic cylinder 226 will be controlled. Specifically, based on a detection value of the first head side pressure sensor S1 and a detection value of the first cap side pressure sensor S2, a cylinder propelling force for the hydraulic cylinder 226 will be calculated from a pressure difference between the cap side chamber and the head side chamber of the hydraulic cylinder 226.

The vehicle body 201 includes an acceleration sensor S3 constituted of e.g. a triaxial acceleration sensor or the like. Based on a detection result of the acceleration sensor S3, tilts of the vehicle body 201 to the front/rear sides and right/left sides are detected. And, based on the result, the posture of the vehicle body 201 is controlled. Namely, in order to allow the posture of the vehicle body 201 to become a target posture, feeding of work oil to the respective hydraulic cylinders 226 will be controlled.

The traveling device 202 includes a rotation sensor S4 for detecting a rotational speed of the drive wheel 207. In operation, based on a rotational speed of the drive wheel 207 calculated by the rotation sensor S4, feeding of work oil to the hydraulic motor 209 will be controlled in such a manner that the rotational speed of the drive wheel 207 may become a target value.

As described above, the work vehicle according to the instant embodiment is configured such that the postures of the bending link mechanisms 204 supporting the drive wheels 207 are changed by the hydraulic cylinders 226 and moreover that the traveling drive too is effected by the hydraulic motor 209. Therefore, the work vehicle is suitable for an agricultural work as being robust against adverse influence from water content, fine dust or the like, unlike an electric motor for instance.

Figure 43:
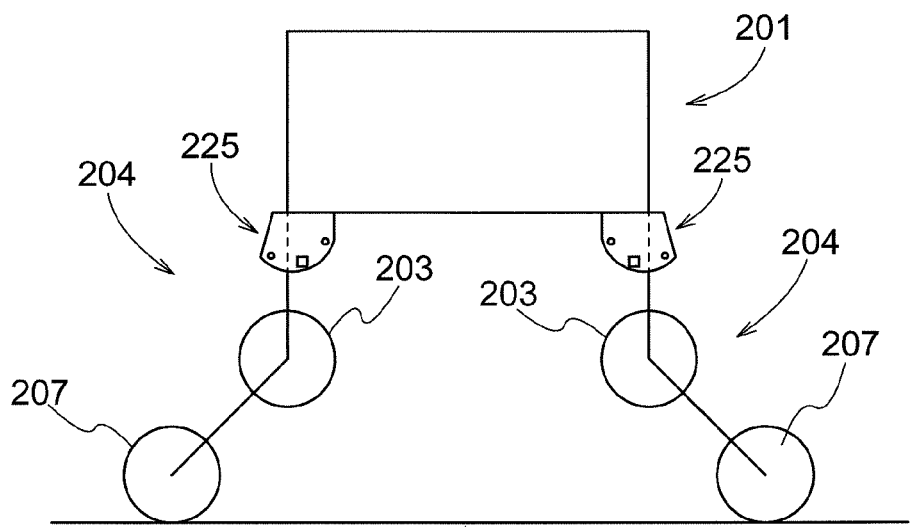
FIG. 43 is an explanatory view of a four-wheel traveling state.
Figure 44:
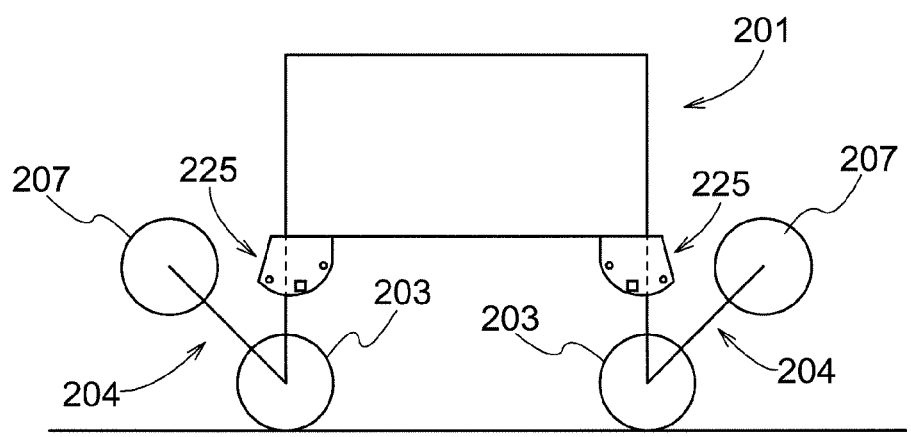
FIG. 44 is an explanatory view of a free movement state.
Figure 46:
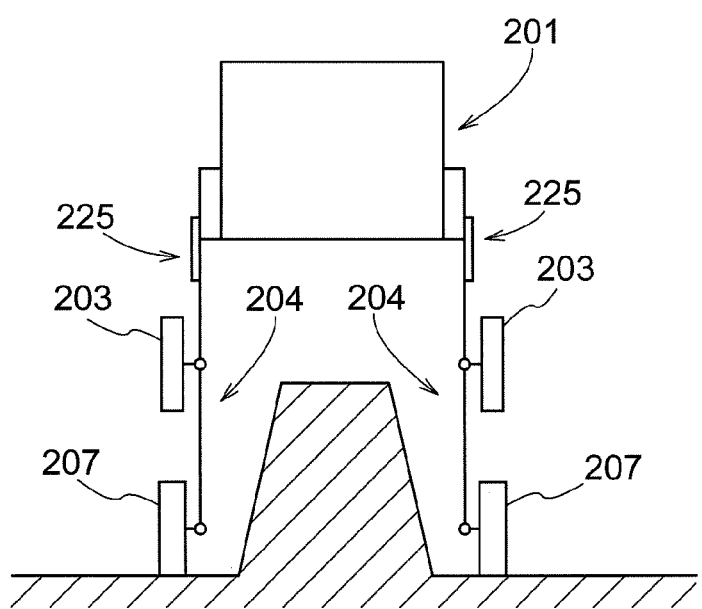
FIG. 46 is a front view of a striding-over traveling state.

In the case of traveling on a flat ground surface, traveling is possible in any one of a plurality of different kinds of traveling modes. Namely, as shown in FIGS. 40-42, there are a state in which all of the four drive wheels 207 and all of the four auxiliary wheels 203 are placed in contact with the ground surface; and as shown in FIGS. 43 and 46, a four wheel traveling state in which all of the four drive wheels 207 are placed in contact with the ground surface and all of the four auxiliary wheels 203 are set afloat the ground surface, etc. FIG. 46 shows a state in which traveling is made with striding over a ridge. In addition to the traveling modes described above, as shown in FIG. 44, it is also possible to be switched to an all-free traveling state in which all of the four sets of drive wheels 207 are lifted afloat the ground surface to provide the free movement state. In this case, traveling drive is not possible, but the vehicle can be easily moved manually.

Figure 45:
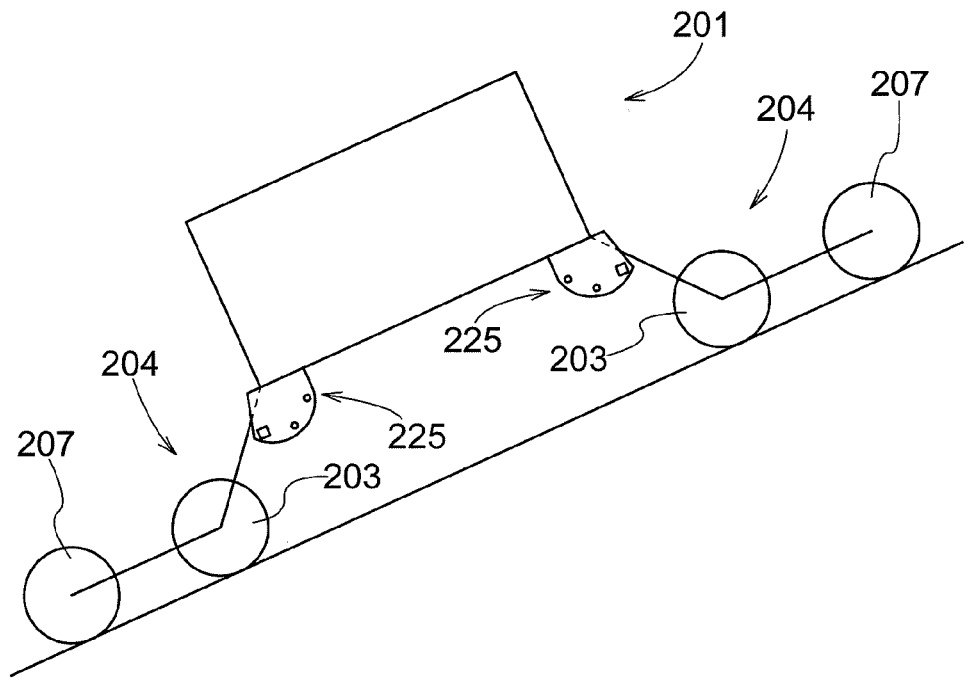
FIG. 45 is a side view of a slope traveling state.

With this work vehicle, in addition to the traveling modes on a flat ground surface described above, as shown in FIG. 45, traveling as riding over a slope is also possible with switching all of the four sets of first link 221 to the outward pivot position to place the place all of the drive wheels 207 and the auxiliary wheels 203 in contact with the ground surface. In this traveling mode, thanks to the increased ground contact width along the vehicle body front/rear direction, traveling is possible in a stable state without falling even on a significantly inclined slope.

Modified Embodiments of Fourth Embodiment (1) In the foregoing embodiment, as the articulated link mechanism, two links 21, 22 are provided and as the drive operating device 205, one hydraulic cylinder 226 is provided. In place of this arrangement, an arrangement as follows is also possible.

As the articulated link mechanism, three or more links are provided to be pivotally coupled to each other to provide three or more joints. And, as the drive operating device, two or more hydraulic cylinders are provided for changing postures of the other links than the first link. Further, as the drive operating device, a hydraulic motor may be provided at the pivot of the bending link mechanism 204, so that the posture of the bending link mechanism 204 may be changed by this hydraulic motor.

(2) In the foregoing embodiment, the traveling device 202 is driven by the hydraulic motor 209. In place of this arrangement, it is also possible to arrange e.g. such that power of an engine mounted on the vehicle is supplied to the drive wheel 207 via a mechanical power transmission mechanism such as a chain transmission mechanism.

(3) In the foregoing embodiment, each traveling device 202 includes one drive wheel 207. In place of this arrangement, it is also possible to arrange such that as the traveling device 202, there is provided a crawler traveling device with a crawler belt wound around a plurality of wheel bodies.

(4) In the foregoing embodiment, the traveling devices 202 are provided one pair on the right and left sides on front/rear opposed sides of the vehicle body 201. Instead, it is possible to provide three traveling devices 202 or five or more traveling devices 202.

(5) In the foregoing embodiment, the turning hydraulic cylinder (turning cylinder 214) is provided. However, the turning operation may be effected by an electric motor or a hydraulic motor. Or, such actuator for turning operation may be omitted. In such case, a turn may be effected based on a difference of drive speeds between the right and left traveling devices on the leading side in the advancing direction.

(6) In the foregoing embodiment, as the manual operation type position fixing device, the retaining rod 231 is inserted into the engagement hole 230 of the restriction member 229 and the insertion hole 228 of the first link 221 to enable switchover among three positions. In place of this arrangement, it is possible to arrange such that the fixing at four or more positions is made by a retaining rod, and also to arrange such that the first link 221 may be retained at a steplessly variable position by a rotational operation of a manual operation handle.

(7) In the foregoing embodiment, a four-leg, four-wheel robot of hydraulic electronic control type was used as an example of "work vehicle". However, the present invention is not limited to the configuration shown in the drawings.

DESCRIPTION OF REFERENCE SIGNS

Corresponding to First Embodiment

1: vehicle body
1A: front side body section
1B: rear side body section
3: traveling device
4: bending link mechanism
5: drive operating device
32: pivot interlocking mechanism
40: turning hydraulic cylinder (actuator)
[Corresponding to Second and Third Embodiments]
101: vehicle body
103: auxiliary wheel
105: hydraulic driving type drive mechanism (drive operating device)
107: drive wheel
110: bending link mechanism (vehicle body supporting portion)
116: turning mechanism
118: turning operating device (turning hydraulic cylinder, turning cylinder)
125: first link
126: second link
X1, X2: horizontal axis
[Corresponding to Fourth Embodiment]
201: vehicle body
202: traveling device
204: articulated link mechanism
205: drive operating device
214: turning operation hydraulic cylinder (turning hydraulic cylinder, turning cylinder)
221: first link
222: second link
225: pivotal position adjusting portion (manual operation type position fixing device)
226: hydraulic cylinder
X1, X2: horizontal axis
Y: vertical axis

What is claimed is:

1. A work vehicle comprising:
a vehicle body;
a plurality of traveling devices disposed on right and left sides on front and rear sides of the vehicle body respectively;
a plurality of bending link mechanisms configured to liftably support each one of the traveling devices to the vehicle body; and
a plurality of drive operating devices capable of changing the posture of each one of the plurality of bending link mechanisms;
wherein each of the bending link mechanisms includes a first link having one end portion thereof supported to the vehicle body to be pivotable about a first horizontal axis, and a second link having one end portion thereof connected to the other end portion of the first link to be pivotable about a second horizontal axis and having the other end portion thereof to which the drive device is supported;
wherein the postures of the bending link mechanisms are changeable to a first posture in which all the other end portions of the first links are located on more inner side than the one end portions of the first links in the vehicle body front/rear direction, and to a second posture in which all the other end portions of the first links are located on more outer side than the one end portions of the first links in the vehicle body front/rear direction;
wherein the vehicle body is split into a front side body section having the right and left traveling devices disposed on the front side and a rear side body section having the right and left traveling devices disposed on the rear side; and
wherein the front side body section and the rear side body section are configured to be bendably pivotable relative to each other via a pivot interlocking mechanism.

2. The work vehicle as defined in claim 1, further comprising:
an actuator capable of changing a bending pivot angle between the front side body section and the rear side body section.

3. The work vehicle as defined in claim 1, wherein a bending pivot angle between the front side body section and the rear side body section can be changed based on a speed difference between the right and left traveling devices in at least one of the front side body section and the rear side body section.

4. A work vehicle comprising:
a vehicle body;
traveling drive wheels provided on right and left sides on opposed front and rear sides of the vehicle body;
a plurality of vehicle body supporting portions configured to support each one of the drive wheels to the vehicle body with allowing change of a height position of the respective drive wheel; and
a drive operating device capable of variably operating the vehicle body supporting portions; and
a plurality of turning mechanisms configured to support the plurality of vehicle body supporting portions respectively to the vehicle body with allowing changing of the respective orientations thereof about a vertical axis; and
an auxiliary wheel provided between a vehicle body side portion of the vehicle body supporting portion and the drive wheel in each of the vehicle body supporting portions, and positioned between the drive wheel on the front side and the drive wheel on the rear side on the right and left opposed sides;
wherein the plurality of drive wheels are supported to be disposed on a vehicle body inner side in a right/left direction relative to the vehicle body supporting portions; and
wherein when the vehicle body has a posture maintained with either one of a combination of the drive wheel and the auxiliary wheel on the front side, and a combination of the drive wheel and the auxiliary wheel on the rear side, the right and left drive wheels disposed on the other are set afloat the ground surface and pivoted to approach each other to allow clamping of an object therebetween.

5. The work vehicle as defined in claim 4, wherein:
each vehicle body supporting portion comprises a bending link mechanism having a first link having one end portion thereof supported to the vehicle body to be pivotable about a horizontal axis and a second link having one end portion thereof supported to the other end portion of the first link to be pivotable about a horizontal axis; and
the drive wheel is supported to the other end portion of the second link and the auxiliary wheel is supported to a coupling portion between the first link and the second link.

6. The work vehicle as defined in claim 4, wherein:
the turning mechanism is capable of changing the respective wheel body supporting portions disposed in opposition to each other in the vehicle body right/left direction to different orientations about the vertical axis; and
the drive wheel is supported to the vehicle body supporting portion to be changeable in an orientation of the drive wheel about the vertical axis.

7. The work vehicle as defined in claim 6, wherein:
by changing the vehicle body supporting portions disposed in opposition to each other in the vehicle body right/left direction to mutually different directions by the turning mechanism, the spacing between the drive wheels of the two vehicle body supporting portions can be changed; and
by changing the orientations of the two drive wheels about the vertical axis, rotational directions of the two drive wheels can be set parallel to each other.

8. A work vehicle comprising:
a vehicle body;
traveling drive wheels provided on right and left sides on opposed front and rear sides of the vehicle body;
a plurality of vehicle body supporting portions configured to support each one of the drive wheels to the vehicle body with allowing change of a height position of the respective drive wheels;
a drive operating device capable of variably operating the vehicle body supporting portions; and
a plurality of turning mechanisms configured to support the plurality of vehicle body supporting portions respectively to the vehicle body with allowing changing of the respective orientations thereof about a vertical axis;
wherein the turning mechanism is capable of changing the respective wheel body supporting portions disposed in opposition to each other in the vehicle body right/left direction to different orientations about the vertical axis; and
wherein the drive wheel is supported to the vehicle body supporting portion to be changeable in an orientation of the drive wheel about the vertical axis and to be fixable in a position of the drive wheel; and
wherein by changing the orientations of the vehicle body supporting portions disposed in opposition to each other in the vehicle body right/left direction to mutually different directions by an operation of the turning mechanism, the spacing between the drive wheels supported by the two vehicle body supporting portions can be changed, and, by adjustably changing the orientations of the two drive wheels about the vertical axis and fixing the positions of the two drive wheels with the spacing between the two drive wheels changed, the two drive wheels can be set to a straight traveling state in which rotation directions of the two drive wheels are along the front/rear direction in a plan view.

9. A work vehicle comprising:
a vehicle body;
a plurality of traveling device for driving traveling;
a plurality of articulated link mechanisms each comprising a plurality of links pivotally connected to each other to provide at least two or more joints and configured to support each one of the traveling devices to the vehicle body with allowing lifting up/down thereof; and
a drive operating device capable of changing postures of the articulated link mechanisms;
wherein a first link included in the plurality of links and located closest to the vehicle body is supported to be pivotable about a horizontal axis with a body side coupling portion of the vehicle body acting as a pivot;
wherein there is provided a manual operation position fixing device capable of selectively fixing the first link at any one of a plurality of preset pivot switching positions;
wherein each of the articulated link mechanisms has a plurality of engagement holes, and the manual operation position fixing device fixes the first link by inserting a retaining rod into one of the plurality of engagement holes for the respective pivot switching positions; and
wherein the drive operating device changes the posture of another link included in the plurality of links than the first link.

10. The work vehicle as defined in claim 9, wherein the articulated link mechanism includes, as the other link, a second link having one end portion thereof supported to another end portion of the first link to be pivotable about a horizontal axis and having another end portion thereof used for supporting the traveling device.

11. The work vehicle as defined in claim 9, wherein the drive operating device comprises a hydraulic cylinder.

12. The work vehicle as defined in claim 9, wherein:
the articulated link mechanism is supported to the vehicle body to be changeable in an orientation of the articulated link mechanism about a vertical axis; and
a hydraulic cylinder for turning operation is provided for changing the orientation of the articulated link mechanism.

* * * * *

UNITED STATES PATENT AND TRADEMARK OFFICE
CERTIFICATE OF CORRECTION

| | |
|---|---|
| PATENT NO. | : 11,767,071 B2 |
| APPLICATION NO. | : 16/762277 |
| DATED | : September 26, 2023 |
| INVENTOR(S) | : Junichi Ishikawa et al. |

It is certified that error appears in the above-identified patent and that said Letters Patent is hereby corrected as shown below:

In the Specification

Column 1, Line 2, below "WORK VEHICLE" insert -- CROSS-REFERENCE TO RELATED APPLICATIONS --

Signed and Sealed this
Fourteenth Day of November, 2023

Katherine Kelly Vidal
Director of the United States Patent and Trademark Office